United States Patent
Murphy et al.

(10) Patent No.: US 10,691,068 B2
(45) Date of Patent: *Jun. 23, 2020

(54) MOBILE HOLOGRAM APPARATUS

(71) Applicant: Virtual Marketing Incorporated, Chicago, IL (US)

(72) Inventors: Matthew Steven Murphy, Chicago, IL (US); Jacob W. Beckley, Chicago, IL (US)

(73) Assignee: VIRTUAL MARKETING INCORPORATED, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/857,075

(22) Filed: Dec. 28, 2017

(65) Prior Publication Data

US 2018/0120767 A1 May 3, 2018

Related U.S. Application Data

(63) Continuation of application No. 15/247,457, filed on Aug. 25, 2016, which is a continuation-in-part of
(Continued)

(51) Int. Cl.
*G03H 1/22* (2006.01)
*G03H 1/02* (2006.01)
*G02B 30/56* (2020.01)

(52) U.S. Cl.
CPC ......... *G03H 1/2202* (2013.01); *G03H 1/0236* (2013.01); *G02B 30/56* (2020.01);
(Continued)

(58) Field of Classification Search
CPC ...... G02B 27/22; G02B 27/2235; G03H 1/22; G03H 1/2202; G03H 2001/2223;
(Continued)

(56) References Cited

U.S. PATENT DOCUMENTS

| | | | | |
|---|---|---|---|---|
| 3,730,818 A | * | 5/1973 | Salinari | B42D 15/042 428/12 |
| 4,064,662 A | * | 12/1977 | O'Toole | E04B 1/34357 52/71 |
| 4,705,209 A | * | 11/1987 | Fujihara | B65D 5/2057 229/109 |
| 7,793,446 B2 | * | 9/2010 | Hluchan | B42D 15/008 206/308.1 |
| 9,946,225 B2 | * | 4/2018 | Murphy | G03H 1/2202 |
| 2011/0234981 A1 | * | 9/2011 | Wang | G03B 21/28 353/10 |

(Continued)

OTHER PUBLICATIONS

DIY Hologram: Best Tutorial to Build a 3D Hologram Pyramid! Link: http://diyhacking.com/diy-hologram/.
(Continued)

*Primary Examiner* — Nicholas R. Pasko
(74) *Attorney, Agent, or Firm* — K&L Gates LLP

(57) ABSTRACT

A mobile hologram apparatus is disclosed. An example apparatus includes a sheet folded along preformed creases into a pyramid structure configured to be actuated between a compressed state and an uncompressed state. The pyramid structure has a base section and a top section connected by four side sections. The pyramid structure in the compressed state has a height that is less than 1/10th the height of the pyramid structure in the uncompressed state. The apparatus also includes an elastic band connected to a perimeter of the base section of the pyramid structure and configured to cause the pyramid structure to self-actuate from the compressed state to the uncompressed state.

20 Claims, 17 Drawing Sheets

Related U.S. Application Data application No. 29/569,369, filed on Jun. 27, 2016, now Pat. No. Des. 858,614.

(52) U.S. Cl.
CPC ... *G03H 1/2286* (2013.01); *G03H 2001/2231* (2013.01); *G03H 2227/02* (2013.01)

(58) Field of Classification Search
CPC ... G03H 2001/2228; G03H 2001/2231; G03H 2001/2234; G09F 19/12
USPC .... 359/1, 22, 23, 24, 25, 28, 32, 33, 34, 35, 359/462, 478; 353/7, 10, 30; 40/124.02, 40/124.08, 124.09, 124.14, 124.15, 40/124.16, 124.17, 124.18, 124.19, 539
See application file for complete search history.

(56) References Cited

U.S. PATENT DOCUMENTS

2015/0338674 A1\* 11/2015 Cornford ............... G02B 30/37
359/479
2017/0371298 A1\* 12/2017 Murphy ............... G03H 1/2202

OTHER PUBLICATIONS

YouTube Video entitled DIY 3d hologram projector using CD case & smartphone, published Aug. 18, 2015, Link: https://www.youtube.com/watch?v=318htTYehjQ.

YouTube Video entitled How to Make 3D Hologram Projector—No Glasses, published Apr. 26, 2015, Link: https://www.youtube.com/watch?v=9t0cOYvOy4M.

\* cited by examiner

MOBILE HOLOGRAM APPARATUS

PRIORITY CLAIM

The present application is a continuation of, claims priority to and the benefit of U.S. patent application Ser. No. 15/247,457, filed on Aug. 25, 2016, which claims priority to and the benefit of U.S. Design patent application No. 29/569,369, now U.S. Pat. No. D858,614, filed on Jun. 27, 2016, the entirety of which are incorporated herein by reference.

BACKGROUND

It is estimated that companies spend approximately $160 billion on all direct and digital marketing. Despite trends towards digital marketing, direct mail still accounts for about $48 billion in spending. Surprisingly, marketers have found that direct mail has a better response rate compared to email. For instance, consumers sometimes experience 'digital-overload' and prefer, at times, reading printed material, even direct mail marketing. The physical look and feel of print marketing offers a break from the bombardment of emails and webpages. However, direct mail materials often cost 100 times more than comparable digital marketing through email. The substantial costs arise from purchasing base materials, printing, and mailing. This significant difference in cost oftentimes reduces the return on the marketing investment in direct mail.

As one can appreciate, the significant costs usually limit direct mail to advertisements for local services and high-value products. A search through a junk-mail pile in any residence yields advertisements for local services including landscaping, painting, housekeeping, real estate services, and day cares. In addition, there are advertisements for high-value products including cars, vacations, real estate, cable/satellite television service, phone service, furniture, and custom/bespoke clothing. To improve the return on investment, marketers are continuously searching for direct mail pieces that standout and improve engagement and response rates, thereby improving the return on investment. For instance, some marketers send direct mail materials that include limited-functionality cell phones that automatically place a call to a service center and display content upon being opened. Other marketers have begun to integrate direct mail pieces with online content. As long as billions of dollars are being spent on direct mail, marketers will continue to create new types of direct mail marketing materials.

SUMMARY

The present disclosure provides a new and innovative mobile hologram apparatus for use in direct mail materials. The example mobile hologram apparatus is configured to self-actuate or open from a compressed state to an uncompressed state when removed from a direct mail piece. In an uncompressed state, the example mobile hologram apparatus has a pyramid-shape with a flat top (e.g., a frustum). The mobile hologram apparatus is made from translucent material, such as plastic, that enables a consumer to view a holographic image produced by internally reflected and/or interfered light. The flat top of the example mobile hologram apparatus is configured to be placed on a display screen of a consumer device. Light, arranged in a predefined pattern, propagates through the flat top (or angled side sections) and reflects off the side sections of the pyramid. The reflected light interferes within a middle of the pyramid to produce a desired holographic image. The use of the mobile hologram apparatus with a network-enabled consumer device facilitates the transmission of content from one or more servers for display within the example apparatus as a holographic image, video, or animation.

In an example embodiment, a mobile hologram apparatus includes a sheet folded along preformed creases into a pyramid structure configured to be actuated between a compressed state and an uncompressed state. The example pyramid structure has a base section and a top section connected by four side sections. The compressed pyramid structure has a height that is less than 1/10th the height of the uncompressed pyramid structure. The example apparatus also includes an elastic band connected to a perimeter of the base section of the pyramid structure and configured to cause the pyramid structure to self-actuate from the compressed state to the uncompressed state.

In another embodiment, a mobile hologram apparatus includes a sheet folded along preformed creases into a pyramid structure configured to be actuated between a compressed state and an uncompressed state. The example pyramid structure has a base section and a top section connected by side sections. The compressed pyramid structure has a height that is less than the height of the uncompressed pyramid structure, and a larger base section than a size of the base section of the uncompressed pyramid structure. The example apparatus also includes an elastic band connected to the base of the pyramid structure and configured to cause the pyramid structure to actuate from the compressed state to the uncompressed state. The apparatus further includes a direct mail envelope dimensioned to accommodate at least the pyramid structure in the compressed state.

In yet another embodiment, a mobile hologram sheet apparatus includes a square-shaped top section located within a middle of the transparent sheet apparatus and four triangular-shaped side sections each having a bottom edge and a top edge. Each of the side sections is connected at the top edge to the top section. The four side sections are 90 degrees apart from each other. The example sheet apparatus also includes four boot-shaped base arms each connected to the bottom edge of one of the side sections. The example sheet apparatus further includes a first four preformed creases located at respective junctions between each of the top edges of the four side sections and the top section, and a second four preformed creases located at respective junctions between each of the side sections and the respective base arms.

Additional features and advantages of the disclosed system, method, and apparatus are described in, and will be apparent from, the following Detailed Description and the Figures.

DETAILED DESCRIPTION

Figure 1:
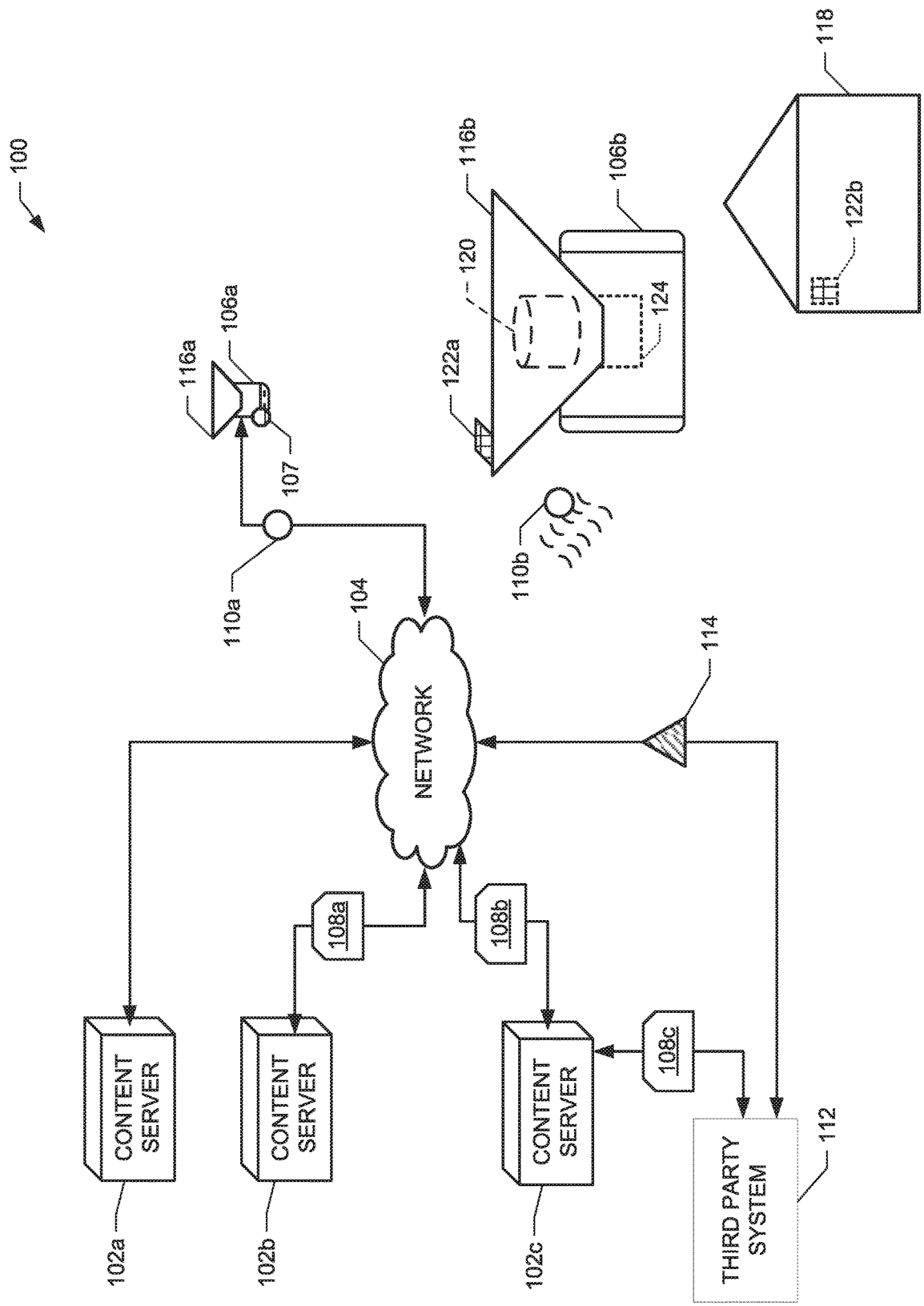
FIG. 1 shows a mobile hologram environment that includes at least one content server, at least one consumer device, and at least one mobile hologram apparatus, according to an example embodiment of the present disclosure.

The present disclosure relates in general to a mobile hologram apparatus or more generally, a hologram projector for use in direct mail. The example mobile hologram apparatus is configured to self-actuate or self-assemble from a compressed state to an uncompressed state when removed from a direct mail piece. In the uncompressed state, the example mobile hologram apparatus has a pyramid-shape with a flat top section, a flat base section, and at least three sides sections (e.g., a frustum). The flat top is configured to be placed on a display screen of a consumer device such that the pyramid-shape is upside down. Preconfigured light beams propagate from the display screen and though the top section and/or side sections of the mobile hologram apparatus. The light reflects off of the side and base sections to intersect within a center of the pyramid-shape. An interference pattern is formed at the point the light intersects to produce a holographic image. The preconfigured light beams may be varied over time to give the appearance that the object shown in the holographic image is rotating or moving. In some instances, the light beams may be varied overtime to cause a holographic video to be displayed.

There are known do-it-yourself hologram devices available. For instance, websites illustrate how a hologram apparatus can be constructed from compact-disc cases or other known plastic components. Generally, a user has to cut the pyramid sides and base from the material. The user than has to glue or tape the sides and base together to from the hologram apparatus. A known issue with these devices is that they are static. Known hologram devices cannot be compressed and uncompressed, which make their use in direct mail materials undesirable.

Some known marketers have attempted to mail unassembled pieces of a hologram device and provide instructions how the pieces are to be glued or taped together. For instance, a known device is mailed in a plastic sheet. A user is instructed to remove the individual side and base sections from the sheet, and then glue or tape the pieces together. A significant drawback of this known device is that consumers go through direct mail very quickly and cannot be bothered with the time consuming task of assembling a hologram device using glue and tape.

The example mobile hologram apparatus disclosed herein overcomes at least some of the above-mentioned issues of known hologram devices by being configured to immediately self-actuate from a compressed state, which is conducive to mailing, to an uncompressed state upon being removed from the direct mail piece. Almost no interaction is required from a consumer other than removing the compressed mobile hologram apparatus. The self-assembly nature of the mobile hologram apparatus encourages consumers to view content associated with the direct mail piece, and hopefully, purchase the related product or service. The disclosure provided herein describes non-limiting examples of mobile hologram apparatuses that are configured to self-assemble.

Throughout the disclosure, reference is made to a hologram or holographic image. As disclosed herein, a hologram or holographic image includes an interference pattern of light formed by pre-specified light beams reflecting off portions of side sections (and/or base section) of a pyramid-shaped mobile hologram apparatus. The hologram or holographic image may be two or three-dimensional. While blue light provides significant clarity, the hologram or holographic image may be displayed in any color or multiple colors. Further, the hologram or holographic image may include a static or dynamic image. For instance, an object displayed within the holographic image may be shown as rotating or moving in-place. In some instances, the hologram or holographic image may include a video.

Reference is also made herein to content for generating a hologram or holographic image. The content may include one or more files that define an image, moving image, and/or video to be displayed by a screen of a consumer device. The files specify how light beams are to be projected from the consumer device such that a reflected intersection of the beams within the mobile hologram apparatus produce a holographic image. The holographic image is generally not viewable on the display screen itself. The content may include, for example, an image of a product, a company trademark, or any other displayable object. As mentioned above, the content may provide a static holographic image or a dynamic image that appears to move or change.

Further, while reference is made to placing the example mobile hologram apparatus on a display screen of a consumer device, it should be appreciated that the mobile hologram apparatus may be used in many different environments and/or use cases. For example, the mobile hologram apparatus may be placed on a television or computer monitor screen. In other examples, the example mobile hologram apparatus may be used in retail environments for product and/or service displays. Further, the mobile hologram apparatus may be used in entertainment, such as 4D theaters or rides that utilize audience interaction.

Moreover, reference is made herein to using the mobile hologram apparatus within direct mail material, such as an envelope. It should be appreciated that the mobile hologram apparatus may also be provided within an insert of a magazine, catalogue, or brochure. The mobile hologram apparatus may also be included within newspapers or dispensed as promotional merchandise at conferences, trade shows, sporting events, fairs, etc. In some examples, the mobile hologram apparatus may be included within product packaging and/or instructions as a way to illustrate, in a tutorial for example, product features or assembly in a three-dimensional image.

Mobile Hologram Environment Embodiment

FIG. 1 shows a diagram of an example mobile hologram environment 100, according to an example embodiment of the present disclosure. The example environment 100 includes content servers 102, a network 104, and consumer devices 106. The example content servers 102 are configured to provide content 108 to the consumer devices 106 responsive to receiving a message 110 including, for example, an identifier and/or link. As mentioned above, the content 108 may include file(s) or message(s) specifying one or more static images, movable images, animation, and/or video. The content 108 may also include file(s) or message(s) specifying a sequence of static images, moveable images, text, video, animation, and/or combinations thereof.

The example content servers 102 are configured to store the content within one or more store systems. The content may be created and/or generated at the content servers 102. Additionally or alternative, the content 108 may be created at a third-party system 112 and transmitted to one of the content servers 102 for distribution. The content is indexed or otherwise correlated to an identifier. In other instances, content is located at separate addresses and/or links.

The example content servers 102 are configured to enable the content 108 associated with a particular identifier and/or location to be edited. For example, the content server 102b is instructed to store a first version of content 108a. At a later time, the content server 102b is instructed to store a second version of the content 108a. The second version may include more timely information or replace stale information. Such a configuration enables a marketer and/or company to change which content is provided to a consumer, even after a direct mail piece with the corresponding identifier and/or link is mailed.

The content servers 102 may be included within any processor, hardware, computer, storage system, workstation etc. Further the content servers 102 may be distributed within a cloud computing network. In some embodiments, the content servers 102 may operate using virtualized systems. For instance, the content servers 102 may provide application programmable interfaces ("API") that are configured to receive specifically formatted messages for particular content. The content servers 102 translate the request messages based on which third-party system is hosting the content, and operate as routers to transmit the requests for content to an appropriate third-party system. The content servers 102 may then route the content received from the third-party system to the consumer device 102, providing the appearance (to the consumer device) that the content server 102 provided the content.

In some embodiments, the content servers 102 may also receive feedback regarding a consumer's interaction with the content. Such information may include, for example, a duration the consumer viewed the content, a number of times the content was replayed, a date/time the content was played, and/or an indication whether a user interacted with the content. Interaction with the content may include, for example, entering information into the consumer device 106 in response to a prompt from the content. Interaction with the content 108 may also include physical actions to move and/or rotate a holographic image displayed by the content 108 (as detected by one more sensors on the consumer device 106), and/or causing the consumer device 106 to navigate to a website or other web-based destination that is related to and/or specified by the content 108. For example, after viewing content 108, the consumer device 106 may transmit a request 114 (per an instruction from a consumer) to the third-party system 112 to view more information or to purchase a product and/or service advertised by the content 108. In some instances, the request 114 may be sent to another entity separate from the third-party system 112 and/or the content server 102c that provided the content 108b. For instance, the third-party system 112 may include a digital marketing company tasked with creating content that advertises a product sold by another company. A response to the content 108 may be sent to a website of the other company and/or a distributor of the other company.

The example network 104 (e.g., the Internet) may include any type of wireless and/or wired network. The network 104 may also include any number of routers and/or switches for transmitting requests for content and/or requests for content between the content servers 102 and/or consumer devices 106. The network 104 may include a cellular, wide area network ("WAN"), and/or local area network ("LAN").

The example mobile hologram environment 100 of FIG. 1 also includes the client devices 106 configured to receive content 108 and display light beams or images to cause the content 108 to be displayed as a hologram. The consumer devices 106 may comprise, for example, a smartphone, a tablet computer, a smartwatch, smart-eyewear, a laptop computer, a desktop computer, a workstation, a processor with a display screen, or a server with a display screen. The consumer device 106 may include a media player for rendering the light beams or images for display as a holographic image. In other examples, the consumer device 106 (e.g., the consumer device 106a) may include a custom application 107 (i.e., an app) configured to render and cause the device 106 to display light beams or images from a display screen. For instance, the application 107 may cause four images separated by 90 degrees to be displayed on a screen of the consumer device 106. The interference of the four images within a four-sided hologram apparatus creates a three-dimensional holographic image. It should be appreciated that the number of images displayed on a screen (by the application 107) of the device 106 should correspond to a number of sides of the example mobile hologram apparatus. The application 107 may also record a consumer's interaction with the holographic image and/or change the appearance of the holographic image based on input received by the consumer device 106 from the consumer.

The consumer device 106 is configured to operate in conjunction with one or more mobile hologram apparatuses 116. In the illustrated example, the mobile hologram apparatus 116 is sent to the consumer within a direct mail piece 118. The mobile hologram apparatus 116 is placed into a compressed state while in the direct mail piece 118. In some embodiments, a consumer device 106 or other device with similar display functionality may also be included or placed within the direct mail piece 118. For instance, a display screen having a memory preloaded with content may be included within the direct mail piece 118. In the illustrated example of FIG. 1, a consumer places the mobile hologram apparatus 116 on the display screen of the consumer device 106, which is loaded with content 108, to view a hologram. In other embodiments, the mobile hologram apparatus 116 may be integrated with a consumer device or other device that has display functionality.

Returning to FIG. 1, after removal from the direct mail piece 118, the mobile hologram apparatus 116 is configured to self-actuate or self-assemble from a compressed pyramid structure into an uncompressed pyramid structure. As provided in more detail below, an elastic band or tension mechanism is placed around a perimeter of a base section of the mobile hologram apparatus 116. The placement of the elastic band around the base section causes the base to restrict when the mobile hologram apparatus 116 is removed from the direct mail piece 118. Restriction of the base section causes side sections to be angled upward forming an uncompressed pyramid structure. Further description of the composition of the mobile hologram apparatus 116 and the direct mail piece 118 is provided in more detail in conjunction with FIGS. 2 to 13 below.

The direct mail piece 118 shown in FIG. 1 may include a retraining mechanism configured to hold the mobile hologram apparatus 116 in the compressed state or flat configuration. The restraining mechanism may include an elastic band placed on an outside of the mobile hologram apparatus 116, an adhesive sticker, or any other device adapted to retain the mobile hologram apparatus 116 in the compressed state. After the restraining mechanism is released or removed, the elastic band or tension mechanism is configured to pull the panels or sections 202, 204, 206, 208 (shown in FIG. 2) of the mobile hologram apparatus 116 into the uncompressed state or expanded configuration.

The example mobile hologram apparatus 116 is configured to be placed upside-down on top of a display screen of the consumer device 106. For instance, mobile hologram apparatus 116a is placed on consumer device 106a and mobile hologram apparatus 116b is placed on consumer device 106b. It should be appreciated that the relative sizes of the mobile hologram apparatus 116 and consumer devices 106 may differ. The positioning of the mobile hologram apparatus 116 on the display screen enables light waves or beams to be projected into the mobile hologram apparatus 116. The light beams reflect off the side and base sections and intersect and interfere with each other within an interior middle of the mobile hologram apparatus 116. The intersection of the light causes a three-dimensional interference pattern to form, which is referred to herein as a hologram or holographic image. The example mobile hologram apparatus 116b of FIG. 1 is shown with a cylinder-shaped holographic image 120.

To obtain the content 108 (e.g., file(s) specifying light waves, beams, or images to be projected from a display screen of a consumer device 106) for displaying the holographic image 120, the direct mail piece 118 and/or the mobile hologram apparatus 116 may include an identifier 122. For instance, identifier 122a is included within or printed on an outside of the base section of the mobile hologram apparatus 116. Additionally, the identifier 122b is included within or printed on the direct mail piece 118. The identifiers 122 may include a bar code, QR code, or any other code that is readable by the consumer device 106. In these examples, a consumer uses the consumer device 106 to scan the code, which includes a network address, website address, and/or content code that corresponds to a location of related content at one of the servers 102. The consumer device 106 transmits message 110, with the content code, to the specified network/website address. In other embodiments, the identifier 122 may include text specifying, for example, a webpage and/or content code. In these other embodiments, the consumer manually enters the website address and/or content code into a web browser. In some alternative embodiments, the identifier 122 may include a microchip that is programmed with a network/website addresses and/or content code. In these examples, the consumer device 106 may read the microchip using a NFC reader or RFID reader, which provides the address and content code for accessing the related content 108 within the content server 102.

The example consumer device 106 is configured to receive the content 108 in one or more messages from the content server 102. The content 108 may include an image file, such as a JPEG. EXIF, TIFF, GIF, BMP, PNG, etc. for displaying a static image. The content 108 may also include a sequence stream of image files to provide the appearance of an animation or moveable image. Alternatively, the content 108 may include a movie file, such as a MOV, WMV, MP3, MP4, MPEG, GPP, Flash, etc. for displaying a video or animation. The consumer device 106 is configured to select a media player that corresponds to the type of received file to display the specified image. The content 108 may also specify the display of alignment markers 124 that guide a user to where the mobile hologram apparatus 116 is to be placed on a display screen of the consumer device 106. The alignment markers 124 may include, for example, a dashed box around a perimeter of the displayed image or a dashed box defining an interior perimeter of the displayed image.

In some embodiments, a web browser may be used by the consumer device 106 instead of a media player. For example, the identifier 122 may include a web address, which when scanned or input, causes a web browser on the consumer device 106 to navigate to a specified webpage that includes the content 108 and/or the alignment guides 124. The content 108 may be rendered through the webpage, using one or more media plugins as needed. in yet other embodiments, the custom application 107 on the consumer device 106 may be configured to render and cause the content to be displayed. The application 107 may be transmitted to the consumer device 106 prior to the content being transmitted, but after the identifier 122 is scanned.

It should be appreciated that the image displayed by the consumer device 106 may appear unintelligible (or four images that are 90 degrees apart (for an apparatus with four side sections)) when viewed by a consumer without the mobile hologram apparatus 116. The displayed image is configured to compensate for the size and/or angle of side sections of the mobile hologram apparatus 116 such that when the light related to the image is reflected, the holographic image 120 is formed. Accordingly, the content 108 provided to the consumer device 106 has to be preconfigured for the screen size of the consumer device 108 and/or the size and/or dimensions of the mobile hologram apparatus 116.

In some embodiments, the identifier 122 may be programmed or otherwise include the content 108. In these examples, the consumer device 106 does not need to access the content server 102. In an example, a QR code may be programmed to include the content 108, which when scanned by the consumer device 106, provides enough information for displaying a static image. In another example, the content 108 is included within a memory of the identifier 122. Scanning of the memory causes the consumer device 106 to receive the content 108 and display a holographic image, video, animation, etc.

In addition to playing an image, the content 108 may also specify sounds to be played and/or instructions for activating a vibrator on the consumer device 106. The audio may be coordinated with the display of the holographic image 120 (or video) to enhance the advertisement or marketing. The vibrator function may also be used to add another sensory feature to the marketing communication (and be coordinated with the display).

In some embodiments, the consumer device 106 is configured to process feedback from a consumer during and/or after viewing the holographic image 120. For example, the consumer device 106 may enable a consumer to enter a specific web address into a web browser to navigate to a webpage to view more information and/or purchase a product and/or service. In other examples, the media player may display a website link or other related information on a display of the consumer device 106. This displayed information is meant to be read from the display and not the mobile hologram apparatus 116. A consumer may view the information and/or select the link to navigate to a webpage to view more information. In yet other examples, the content 108 may include instructions causing the consumer device 106 to automatically navigate to a specified webpage after the presentation of the holographic image 120. Such a configuration combines the engagement of the holographic image 120 with an increased potential for a consumer purchase.

In some examples, the consumer device 106, using for example the custom application 107 or through website code, may track how a consumer interacts with the holographic image 120. As mentioned above, this may include tracking how long the image 120 was viewed, a number of separate times the images was viewed, a date/time the image was viewed, and/or whether the consumer navigated to a webpage to view more information. In instances where the application 107 tracks the interaction, the application may cause the consumer device 106 to transmit periodic messages 114 to the content server 102 and/or the third-party system 112 indicative of the interaction.

In some examples, the content 108 may include instructions that activate one or more sensors on the consumer device 106 to enable a consumer to interact with the holographic image 120. In other examples, the custom application 107 may be used to manage interaction control. In an embodiment, the content 108 may instruct the consumer device 106 to detect, through capacitance-sensing of the display screen, when a consumer touches the mobile hologram apparatus 116. In other words, the mobile hologram apparatus 116 may comprise a three-dimensional extension of the display screen. Based on the consumer's interaction, the content 108 may include instructions that specify how the holographic image 120 is to be modified. For example, after detecting a consumer has touched a side section of the mobile hologram apparatus 116, the consumer device 108 may detect the corresponding section of the display screen, which causes a media player or application 107 to determine that the holographic image 120 is to be rotated to face the selected section. In other examples, the application 107 may detect certain consumer touching around the mobile hologram apparatus 116, thereby causing the holographic image 120 to rotate, enlarge, zoom-in/out, progress faster or rewind through a video, etc.

In other embodiments, the consumer device 106 may activate a camera that records a consumer's interaction with the mobile hologram apparatus 116. The consumer device 106, via the application 107, for example, may use image processing to determine consumer movement with respect to the mobile hologram apparatus 116. For instance, an imaging feature of the application 107 may include one or more rules and/or routines for identifying the mobile hologram apparatus 116 within an image. The imaging feature may also include rules and/or routines for identifying fingers, hands, pens, etc. The imaging feature may further determine a distance between the mobile hologram apparatus 116 and a consumer's fingers. The imaging feature may then determine how the distance changes over time in relation to different parts of the mobile hologram apparatus 116. The imaging feature may also correlate the detected movement to one or more rules that specify how the holographic image 120 is to be changed or altered. For instance, based on detected movement, the application 107 may cause the holographic image 120 to rotate, pan, zoom in/out, enlarge, change colors, etc. In some instances, this interaction may also be tracked and transmitted to the content server 102 and/or the third-party system 112.

Mobile Hologram Apparatus Embodiment

Figure 2:
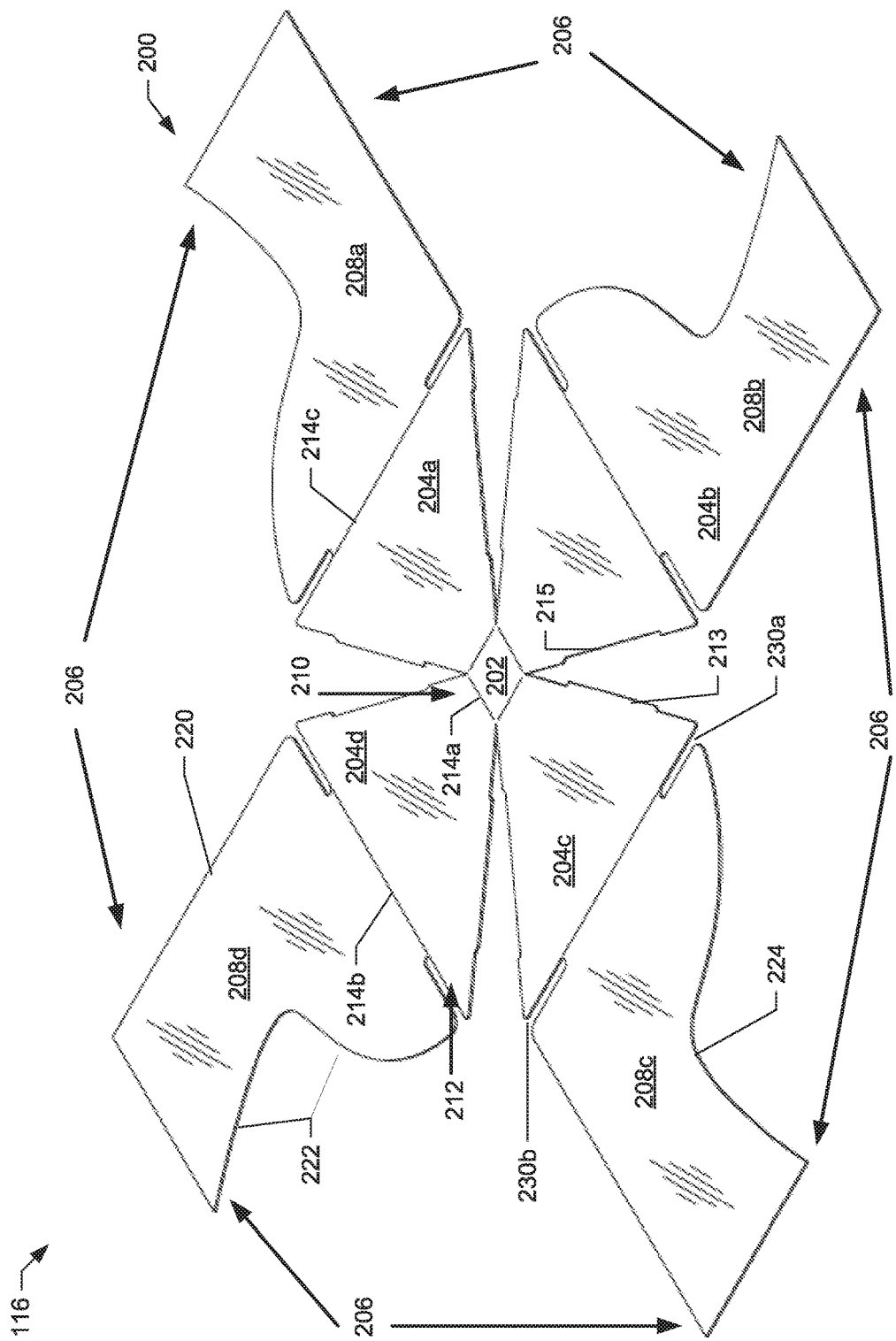
FIG. 2 shows a diagram of a sheet used to form the mobile hologram apparatus of FIG. 1, according to an example embodiment of the present disclosure.

FIG. 2 shows a diagram of a sheet 200 used to form the mobile hologram apparatus 116 of FIG. 1, according to an example embodiment of the present disclosure. It should be appreciated that the pattern depicted by the sheet 200 is only an example. In other embodiments, the sheet 200 may be configured in a different pattern that is foldable, bendable, or otherwise capable of being constructed into a mobile hologram apparatus. For example, as discussed in conjunction with FIGS. 16 to 18, the sheet may include sections for a support stand.

The example sheet 200 of FIG. 2 includes a top section 202, side sections 204, and a base section 206 that comprises four base arms 208. The sections 202, 204, 206, and 208 include panels of material, preferably transparent or semi-translucent material. In some instances, the base section 206 may include an opaque material.

In the illustrated example, the mobile hologram apparatus 116 is configured to include four side sections 204 such that the top section 202 and the bottom section 206 are formed into squares. However, in other embodiments, the mobile hologram apparatus 116 may include a few as three sides or as many as ten sides. Correspondingly, the top section 202 and the base section 206 are configured to be formed into the appropriate shape (e.g., a triangle, pentagon, hexagon, etc.).

The example top section 202 is located in a middle of the sheet 200. The four side sections 204 are configured to extend outward from the top section 202 and be separated by approximately 90 degrees. Each of the side sections 204 has a triangular-shape, which enables the side sections to be joined together to form a pyramid structure. Additionally, each of the side sections includes a first side with a tab 213 and a second side with a notch 215. The tab 213 is configured to fit within the notch 215 of an adjacent side section when the mobile hologram apparatus 116 is formed into an uncompressed pyramid. The tab 213 and notch 215 are configured to help support and connect the side sections 204 together, thereby preventing light from escaping and ensuring the side sections are positioned at the desired angles with respect to each other.

As shown in FIG. 2, each side section has a top edge 210 and a bottom edge 212. The top edge 210 is configured to contact the top section 202. The bottom edge 212 is configured to contact the respective base arm 208. Creases 214 (or joints) are formed where the top edge 210 of the side section 204 contacts the top section 202 and where the bottom edge 212 contacts the respective base arm 208. The creases 214 are configured to enable the side sections 204 and base arms 208 to be folded or otherwise bent to form a pyramid (or frustum) structure.

The example base arms 208 are configured to be combined or otherwise integrated together to form a square-shaped base section 206. In the illustrated example, each of the base arms 208 has an L-shape or boot-shape. A first side 220 of the base arm 208 is relatively straight and configured to contact the crease 214 between an adjacent side section 204 and base arm 208 when the mobile hologram apparatus 116 is in an uncompressed state. For example, the first side 220 of the base arm 208d is configured to contact adjacent side section 204a and base arm 208a at crease 214c when the mobile hologram apparatus 116 is assembled and uncompressed. Such a configuration provides support for the mobile hologram apparatus 116 and restricts how far the base arms 208 can be actuated.

Each of the base arms 208 also includes a second side 222 opposite of the first side 220. The example second side 222 has a curved shape that enables the base arms 208 to be pressed or integrated together to form the base section 206 when the mobile hologram apparatus 116 is in the uncompressed state. For instance, in the uncompressed state, the base arms 208 contact each other at respective indentation sections 224. It should be appreciated that the second side 222 of the base arms 208 may have any shape that enables the base arms 208 to be combined together to form the base section 206 of the mobile hologram apparatus 116.

The example sheet 200 of FIG. 2 also includes recess sections 230 located between the base arms 208 and the side sections 204. The recess sections 230 in the illustrated embodiment are located at the first and second sides 220 and 222 of the base arms 208. In other examples, only one recess section may exist between the base arm 208 and the side section 204. In these examples, the recess section 230 may be located in the middle of the connection between the base arm 208 and the side section 204. The example recess sections 230 are configured to enable an elastic band to be placed around a perimeter of the base section 206 when the mobile hologram apparatus 116 is assembled.

The example sheet 200 of FIG. 2 is configured to be constructed from a bendable or foldable material including, for example, plastic, a plastic-polymer compound, a biological polymer, bendable glass, a carbon-based compound, bendable crystal, and/or combinations thereof. The sheet 200 may be formed by initially cutting a square or rectangle of plastic from a roll. Then, each of the sections 204 and 208 may be formed by cutting along a stencil. After the sheet 200 is cut using a stencil, the creases 214 may be formed. In other examples, the sheet 200 may be created using injection molding. In these examples, the creases 214 may be formed through the molding process or added afterwards.

The sheet 200 may have a width between 10 centimeters ("cm") and 75 cm and a length between 10 and 75 cm. It should be appreciated that the sheet 200 may be smaller than 10 cm and larger than 75 cm depending on the application. Further, the sheet 200 has a thickness between 0.1 millimeters ("mm") and 4 mm. However, the sheet may be thinner than 0.1 mm and thicker than 4 mm depending on the application.

The example sheet 200 is configured to be transparent to enable a consumer to view the internal holographic image 120. However, the angling of the side sections 204, despite being transparent, still causes at least some light to reflect to a center of the mobile hologram apparatus 116. In some instances, the internally-facing side of the side sections 204 and/or the base arms 208 may be coated with a transparent or semi-transparent film that improves light reflectivity.

In some examples, the side arms 208 may be opaque to prevent overhead light from diminishing the appearance of the holographic image 120. For example, ink or dyes may be injected into the side arms 208 during manufacture. Alternatively, an externally facing side of the side arms 208 may be coated in a film or printed. Further, the identifier 122 may be printed onto an externally-facing side of the base arms 208.

In yet other examples, the transparent sheet 200 may be formed from a lamination of multiple layers. In these other examples, a thin opaque layer may be placed between two transparent layers in the base arms 208. Some or all of the opaque layer may include externally-facing printed text or images. For example, the opaque layer may include a company name, company trademark, company logo, and/or one or more marketing images. In an embodiment, each of the base arms 208 may include a portion of an image that is complete when the base arms 208 are folded together to form the uncompressed pyramid structure of the mobile hologram apparatus 116. The opaque layer may also include the identifier 122. Further, an internally-facing side of the opaque layer or a different layer may include a film or other costing to improve light reflection within the mobile hologram apparatus 116.

In some embodiments, an externally-facing side of the top section 202 may be coated in a film or other adhesive to improve a connection between the mobile hologram apparatus 116 and display screen of the consumer device 106. In some instances, the film and/or adhesive may create a static-based bond with the display screen. In other instances, the film and/or adhesive may form a removable chemical bond with the display screen. In yet other instances, the top section 202 may not contain a film and/or adhesive. Further, in some sections, the top section 202 may be cut out or define a window that is framed by the top edge 210 of the side sections 204. Moreover, in other embodiments, the top section 202 may include a window, such as a circular or square window.

Reference is made throughout to the sheet 200 being assembled into the example mobile hologram apparatus 116 and being in a compressed state (e.g., a flat configuration) or uncompressed state (e.g., a expanded configuration). FIGS. 3 to 6 show the mobile hologram apparatus 116 in a compressed state. FIG. 7 shows a transition of the mobile hologram apparatus 116 from the compressed state to the uncompressed state. FIGS. 8 to 13 show the mobile hologram apparatus 116 in the uncompressed state.

Compressed State Embodiment

Figure 3:
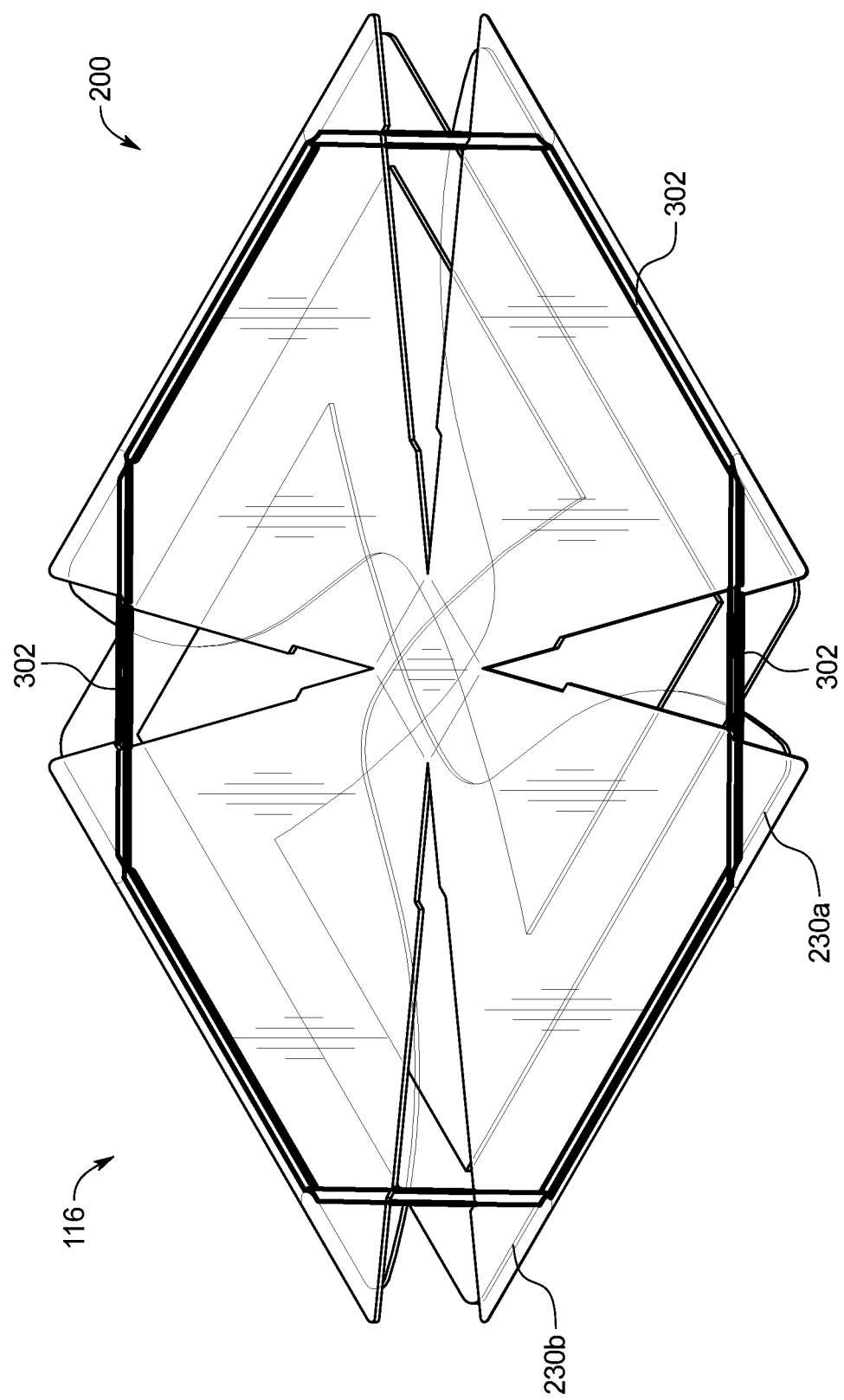
FIGS. 3 to 6 show diagrams of the mobile hologram apparatus of FIGS. 1 and 2 in an assembled, compressed state, according to example embodiments of the present disclosure.

FIG. 3 shows a diagram of the sheet 200 of the mobile hologram apparatus 116 of FIG. 2 in a compressed state (e.g., a compressed pyramid structure), according to an example embodiment of the present disclosure. In the compressed state, the example sheet 200 is assembled in a pyramid (or frustum) structure that is substantially flat, or where at least a height of the mobile hologram apparatus 116 in the compressed state is less than 1/10 the height of the mobile hologram apparatus 116 in the uncompressed state. For instance, in the compressed state, each of the four side sections 204 are substantially in the same plane as the top section 202. However, in some compressed state examples, the side sections 204 may be at a slight angle (e.g., between 0 degrees and 15 degrees) from the top section 202 at the respective creases 214.

Additionally, in the compressed state, the base arms 208 are approximately folded 180 degrees with respect to the side sections 204. In other words, the base arms 208 are folded inwards towards the middle of the sheet 200 or towards the top section 202. In addition, the base arms 208 overlap or interlock with each other. In some examples, the base arms 208 may be at a slight angle (e.g., between 165 degrees and 180 degrees) from the corresponding side section 204 at the respective crease 214. Such a configuration enables the mobile hologram apparatus 116 to be substantially flat for mailing within a direct mail piece.

FIG. 3 also shows elastic band 302 (or more generally a tension mechanism) that is positioned about a perimeter of the base 206 (e.g., at the intersection of the base arms 208 and respective side sections 204). The elastic band 302 is configured to be positioned within recessed sections 230 to facilitate contacting the bottom edges 212 of the side sections 204 and/or portions of the base arms 208. In some embodiments, the elastic band 302 contacts the base arms 208 at a portion that is between the recessed sections 230. Further, the elastic band 302 is configured to be placed on the externally-facing side of the base arms 208.

In the compressed state, shown in FIG. 3, the elastic band 302 is stretched. Accordingly the elastic band 302 is configured to retain elasticity memory through the mailing process. The elastic band 302 may include, for example, an Aero® clear retainer elastic band. In the illustrated example, the elastic band 302 has a length of 8 cm, a width of 3 mm, and a thickness of 0.3 mm. In other example, the elastic band 302 may be dimensioned differently based on the size of the sheet 200. The elastic band 302 may be comprised of rubber, an elastomeric plastic, an elastomeric polymer, combinations thereof, or any tension mechanism.

Figure 4:
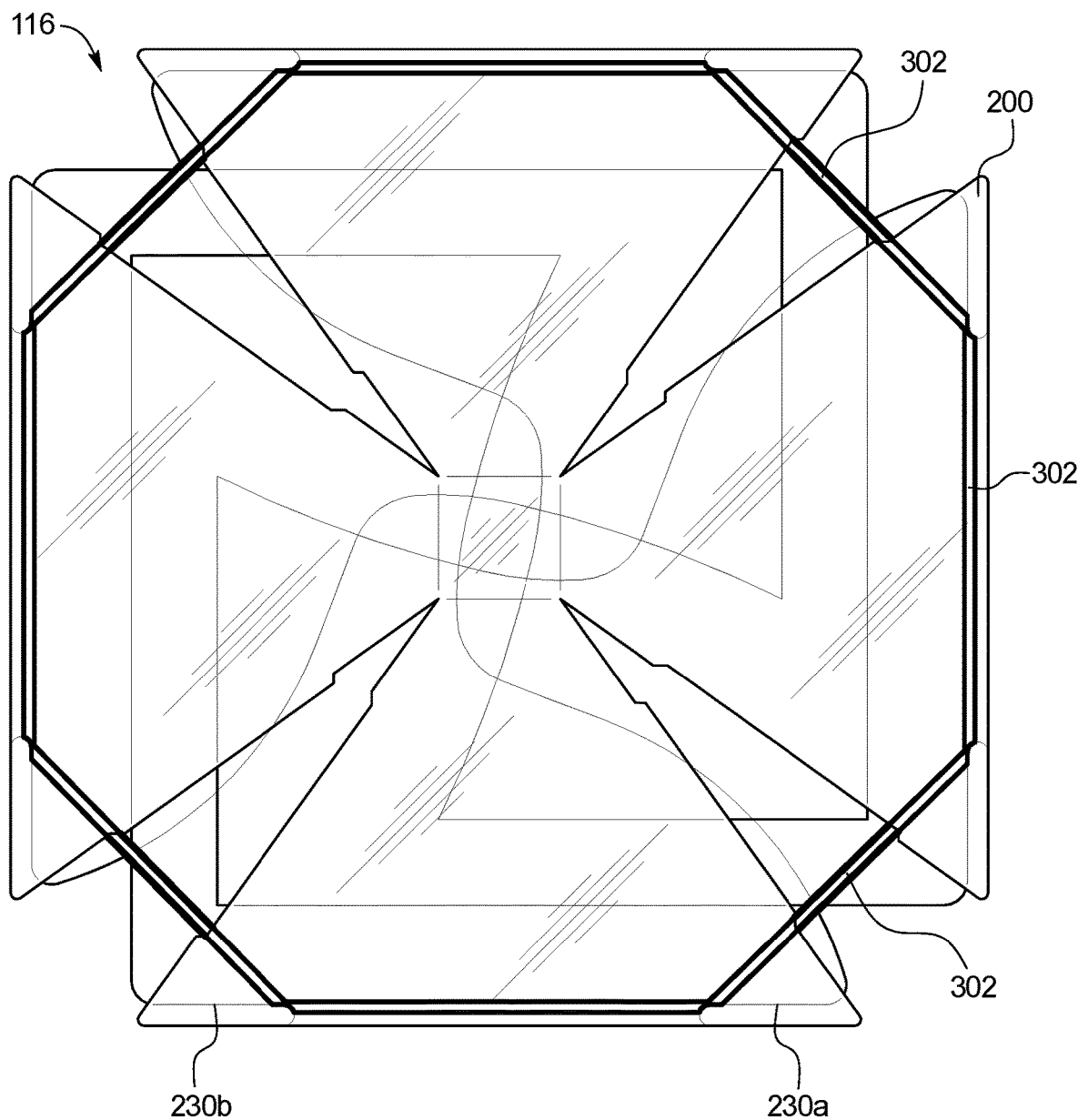

FIG. 4 shows a diagram of a top-down view of the mobile hologram apparatus 116 of FIG. 2 in the compressed state, according to an example embodiment of the present disclosure. The elastic bands 302 are shown circumventing the corners of the side sections 204 and base arms 208 of the sheet 200 and progressing through the recessed sections 230. Further, in the compressed state, because the side sections 204 are substantially planar with the top section 202, the base arms 208 are 'pushed out' from a center of the mobile hologram apparatus 116. The mobile hologram apparatus 116 actuates to the uncompressed state by the elastic band 302 constricting against the base arms 208, thereby causing self-actuation to form an uncompressed pyramid structure.

Figure 5:

FIG. 5 shows a diagram of a side-profile view of the mobile hologram apparatus 116 of FIG. 2 in the compressed state, according to an example embodiment of the present disclosure. As illustrated, in the compressed state, the folded and assembled sheet 200 is substantially flat. In some embodiments, the height of the mobile hologram apparatus 116 in the compressed state is a few millimeters.

Figure 6:
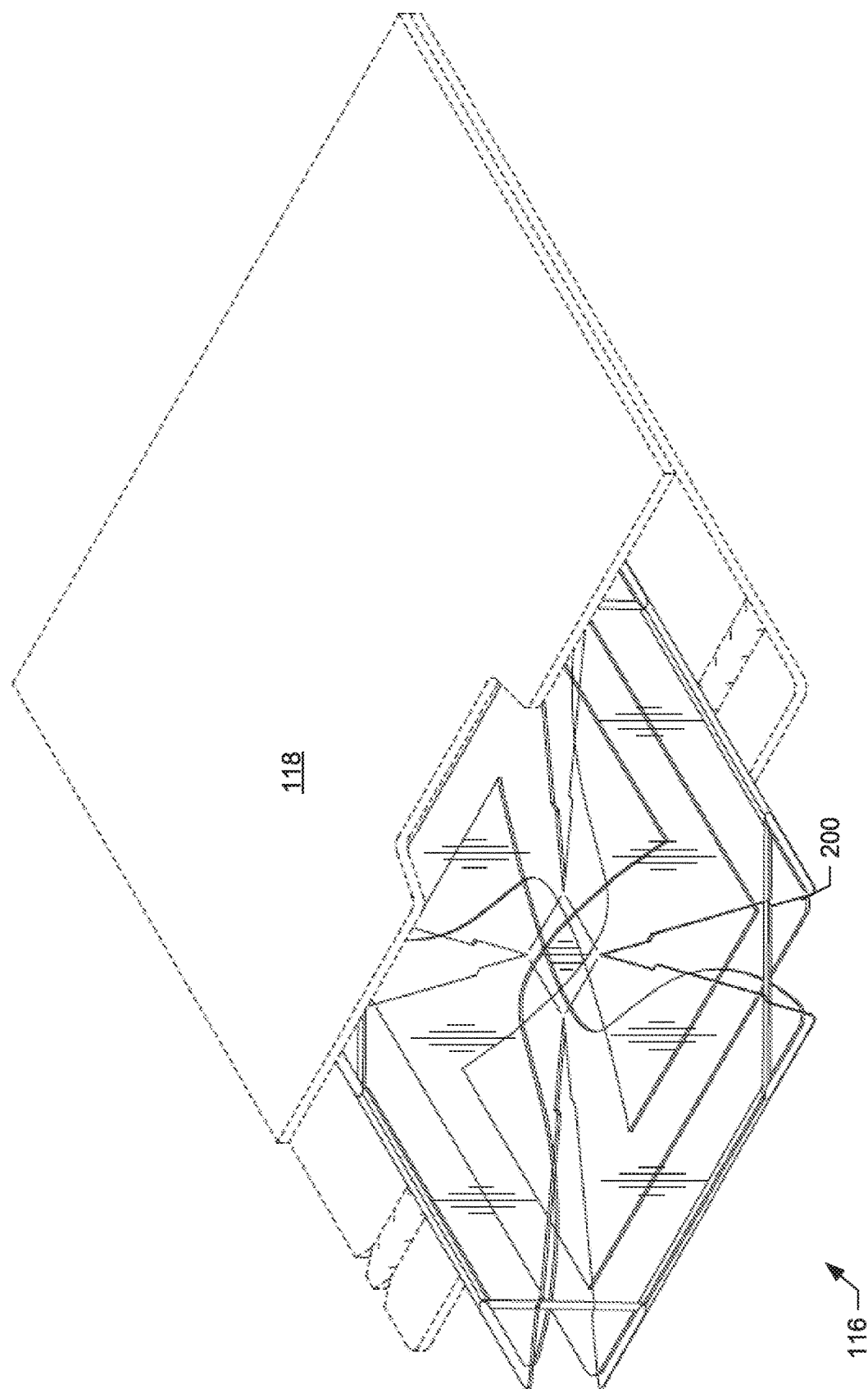
Figure 7:
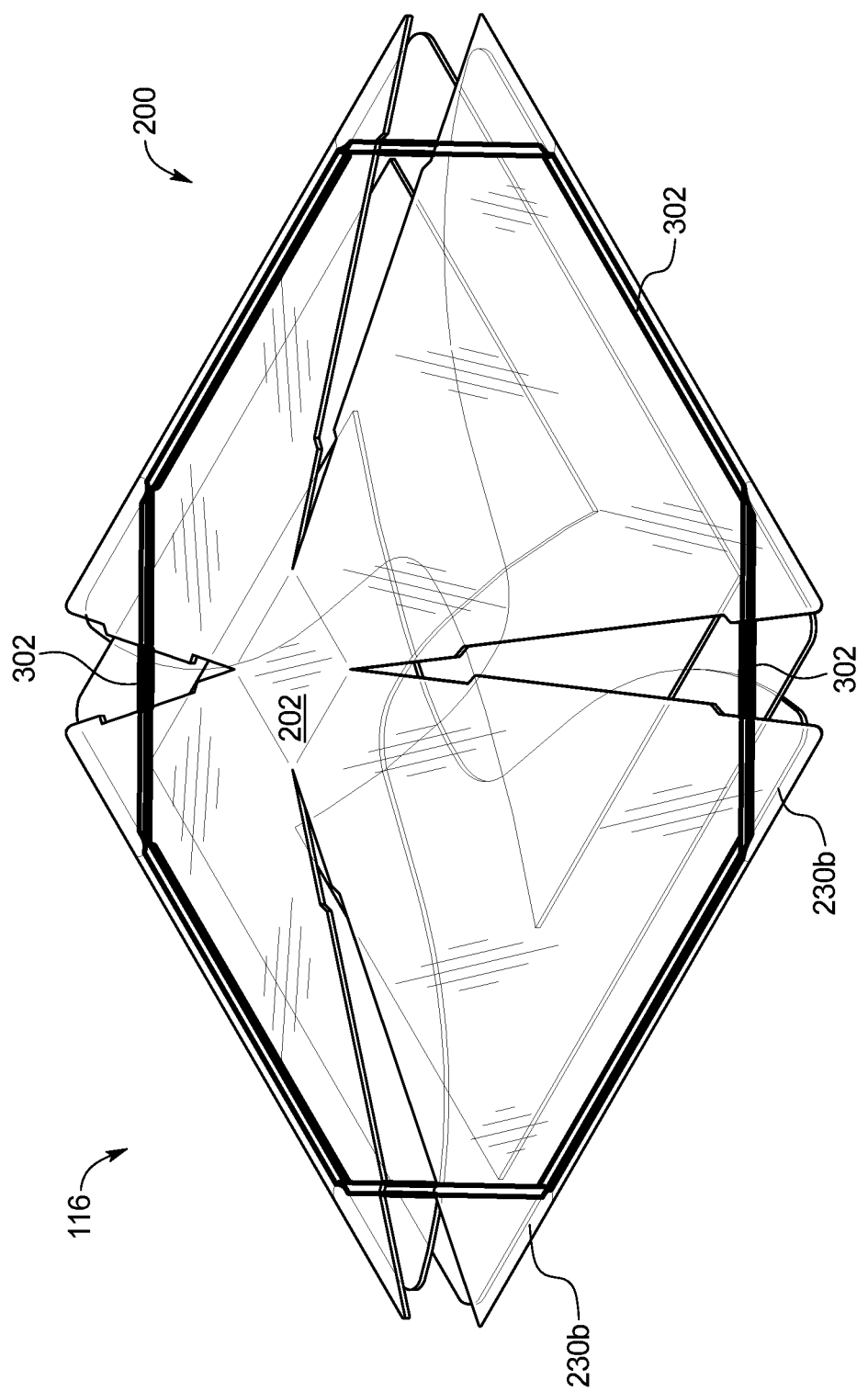
FIG. 7 shows a diagram of the mobile hologram apparatus transitioning from the compressed state to an uncompressed state, according to an example embodiment of the present disclosure.

FIG. 6 shows a diagram of mobile hologram apparatus 116 of FIG. 2 in the compressed state being placed inside of direct mail piece 118, according to an example embodiment of the present disclosure. The relatively flat nature of the mobile hologram apparatus 116 enables it to be inserted or otherwise included within direct mail pieces without incurring additional mailing costs. While the direct mail piece 118 of FIG. 6 is shown as an envelope, in other examples, the direct mail piece may include a brochure, a catalog, a magazine, a newspaper, etc.

Transition Embodiment

FIG. 7 shows a diagram of the sheet 200 of FIG. 2 between the compressed state shown in FIGS. 3 to 6 and an uncompressed state, according to an example embodiment of the present disclosure. In this example, the mobile hologram apparatus 116 is removed from the direct mail piece 118 and allowed to self-assemble or actuate into an uncompressed pyramid structure. During self-actuation, the elastic band 302 constricts against the base arms 208 at the intersection with the side sections, thereby causing the base arms 208 to move toward the center of the sheet 200. This movement of the base arms 208 towards the center of the mobile hologram apparatus 116 causes the side sections 204 to angle upwards, which causes the top section 202 to be pushed upwards.

The elastic band 302 continues to constrict until the first side 220 of the base arms 208 contacts an adjacent base arm-side section juncture or crease 214. At this point, the base arms 208 cannot move inward any further. Additionally, the base section 206 is substantially square.

Uncompressed State Embodiment

Figure 8:
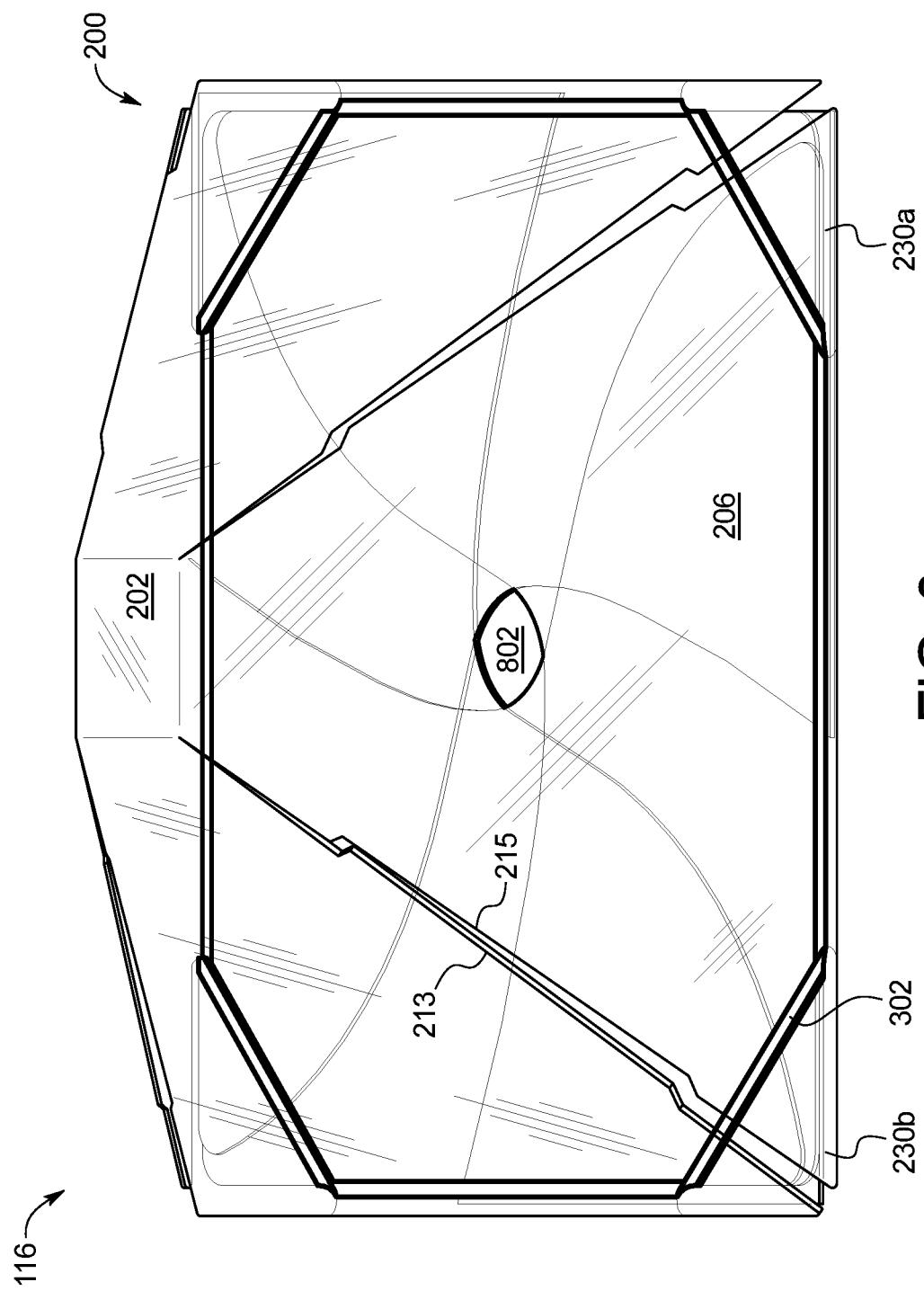
FIGS. 8 to 13 show the mobile hologram apparatus of FIGS. 1 and 2 in the uncompressed state, according to example embodiments of the present disclosure.

FIG. 8 shows a diagram of the sheet 200 of the mobile hologram apparatus 116 of FIG. 2 in an assembled, uncompressed state (e.g., an uncompressed pyramid structure), according to an example embodiment of the present disclosure. While the mobile hologram apparatus 116 appears to have a rectangular-shape, it should be appreciated that the perspective provides an appearance of elongation. However, in some embodiments, the mobile hologram apparatus 116 may actually have a rectangular-shape.

In the illustrated example, the mobile hologram apparatus 116 is shown from a bottom-perspective. In this example, the base arms 208 are compressed together. In some instances, a window 802 may exist within a center of the base section 206 at the intersection of the base arms 208. In other instances, the window 802 may be absent with the base arms 208 overlapping at the center of the base section 206. In the uncompressed state, the elastic band 302 continues to exert a constrictive force on the base arms 208, which holds the mobile hologram apparatus 116 together in the uncompressed pyramid shape. As mentioned above in conjunction with FIG. 7, the elastic band 302 causes the first side 220 of the base arms 208 to contact an adjacent base arm-side section juncture or crease 214, which provide rigidity. Further, in the compressed configuration, the tab 213 and notch 215 are jointed together, which provides additional support for the side sections 204.

As shown in FIG. 8, in the uncompressed state, each of the four side sections 204 are folded at an angle of approximately 45 degrees with respect to the top section 202 and the base arms 208 at the respective creases 214. In other examples, the slope of the angle may vary between 25 degrees to 75 degree depending on the design and dimensions of the mobile hologram apparatus 116.

Figure 9:
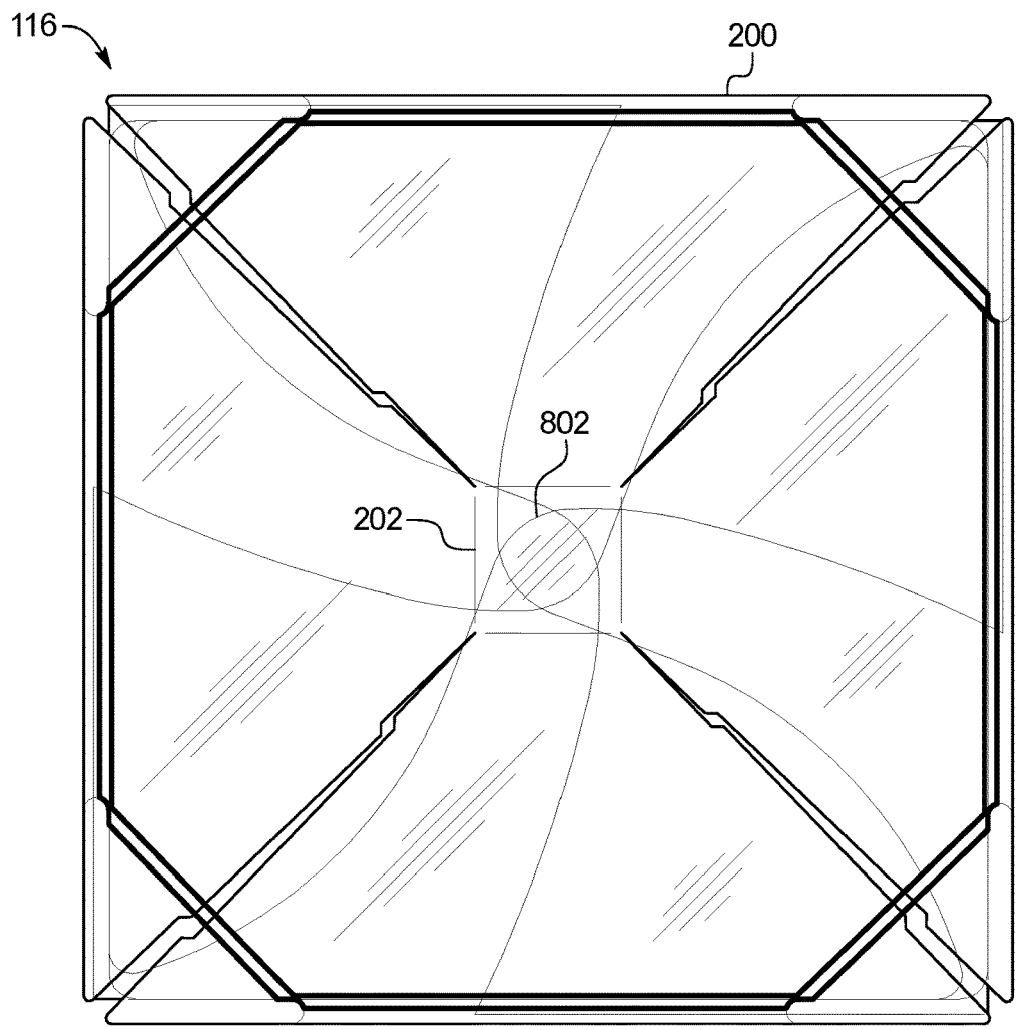
Figure 10:
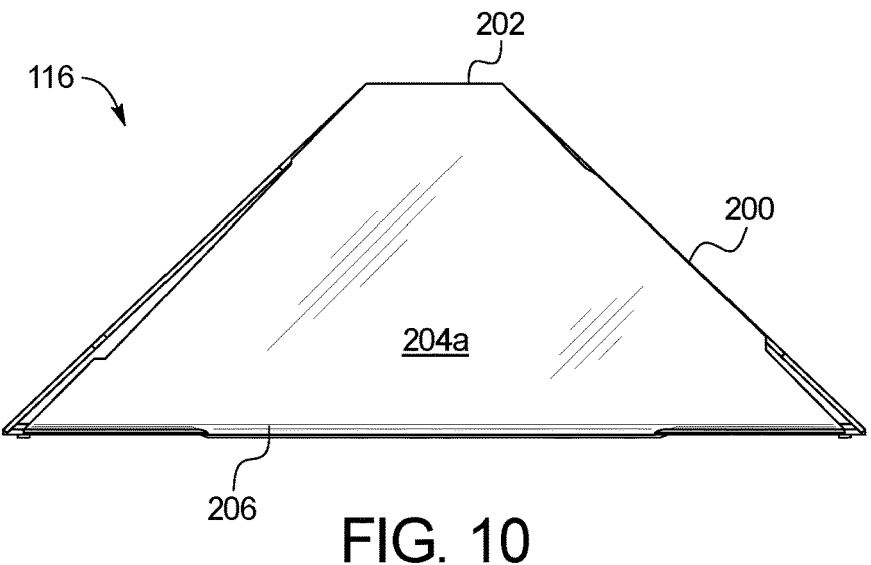

FIG. 9 shows a diagram of a top-perspective view and FIG. 10 shows a diagram of a side-profile view of the mobile hologram apparatus 116 of FIG. 8 in the assembled, uncompressed state, according to example embodiments of the present disclosure. In these figures, the top section 202 and the base section 206 are shown as having a square-shape, with the top section 202 having an area that is a fraction of the area of the base section 206. Further, the top section 202 is aligned in parallel with the base section 206. Moreover, as shown in FIG. 9, the window 802 of the base section 206 is aligned with the tope section 202.

It should be appreciated that once in the uncompressed state, the example mobile hologram apparatus 116 may be returned to the compressed state by a consumer. For instance, a consumer may apply force to the top section 202, which causes the top section 202 to push the side sections 204 outward as the top section 202 moves towards the base section 206. The outward force exerted by the side sections 204 causes the base arms 208 to separate and move outward, thereby extending the elastic band 302. Compression ends when the mobile hologram apparatus 116 is substantially flat. However, once the force exerted by the consumer is removed, the mobile hologram apparatus 116 self-actuates to the uncompressed state.

Figure 11:
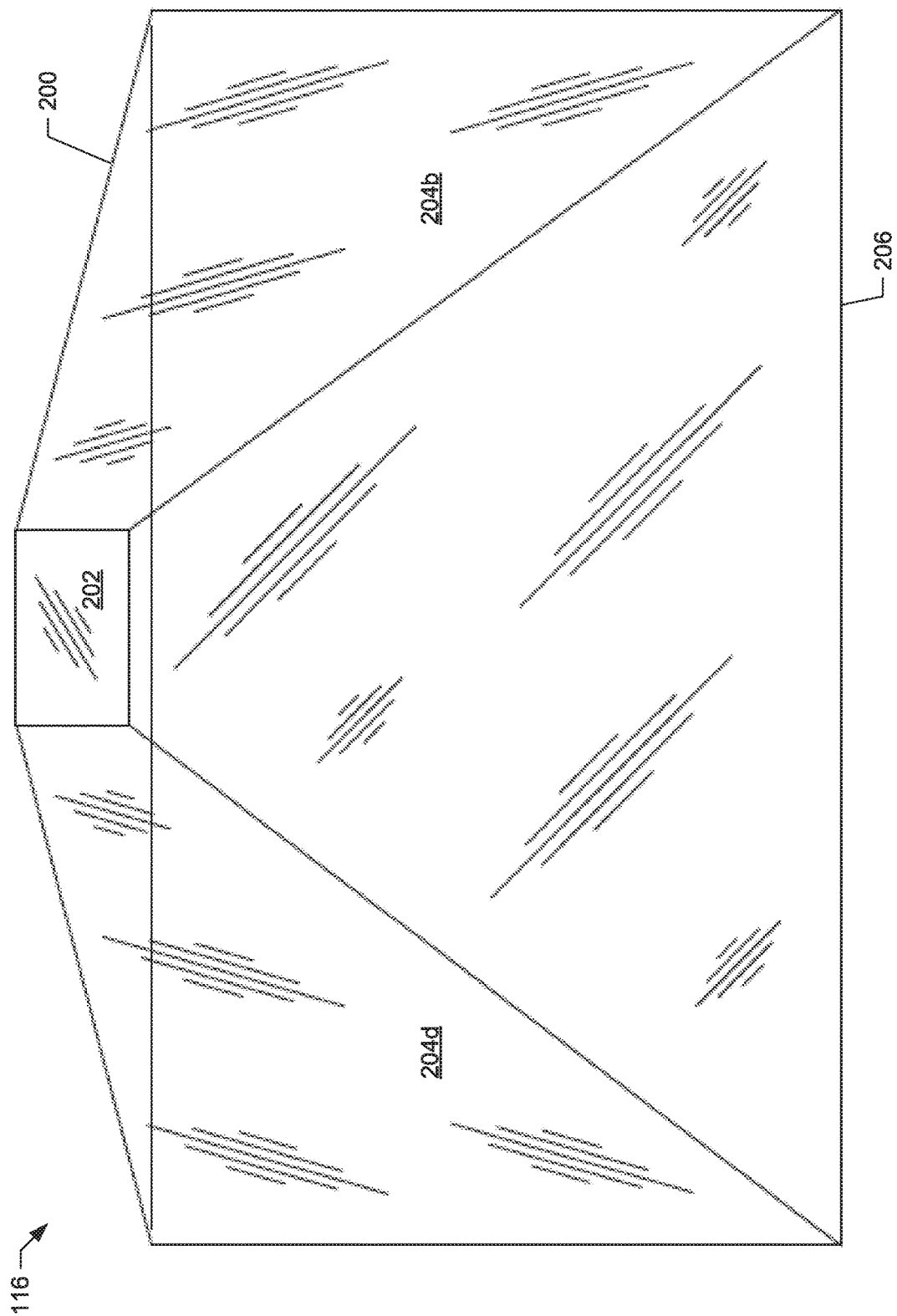
Figure 12:
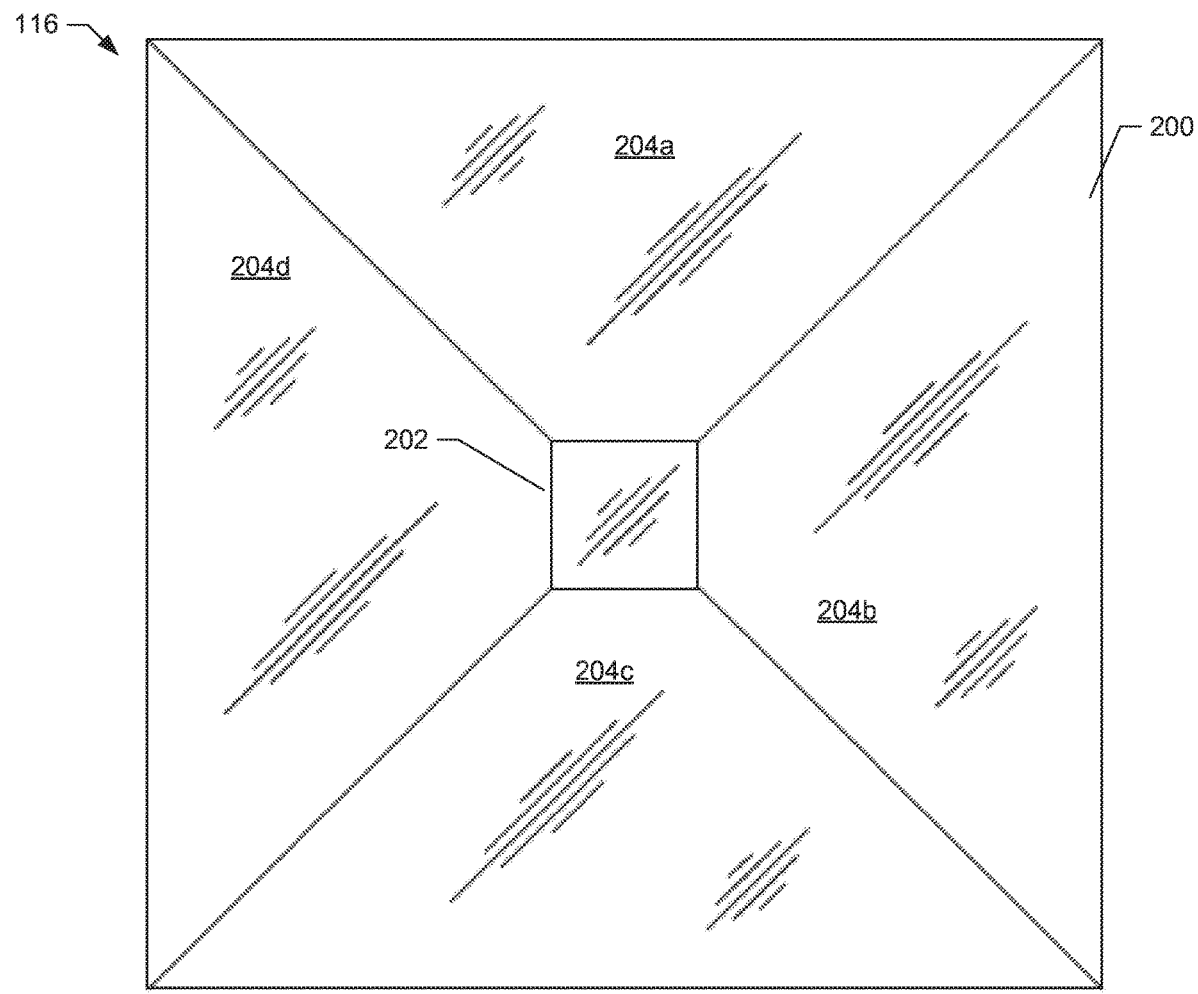
Figure 13:
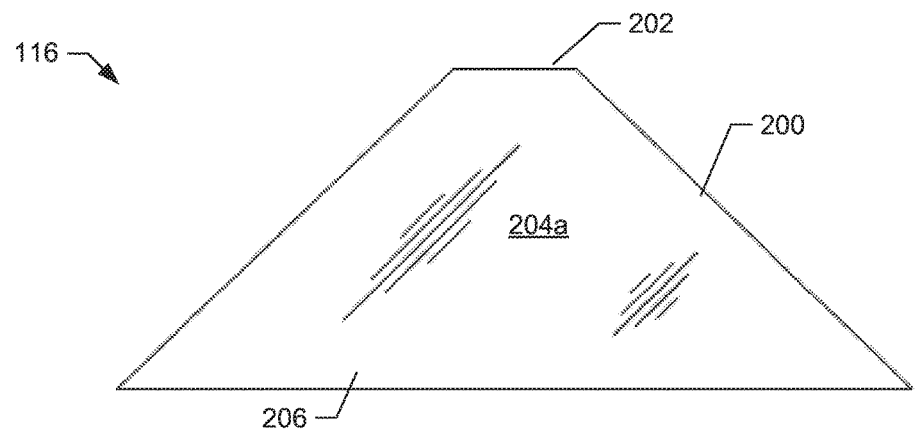

FIGS. 11 to 13 show diagrams of a solid embodiment of the mobile hologram apparatus 116 of FIG. 8 in the uncompressed state, according to examples of the present disclosure. In these examples, the sheet 200 cutout perimeter lines (e.g., the first side 220 and second side 222 of the base arms 208 and the tab 213 and notch 215 of the side sections 204) are omitted to show more clearly the overall pyramid structure of the mobile hologram apparatus 116. Similar to FIG. 8, FIG. 11 shows a bottom-perspective view of the mobile hologram apparatus 116. Further, similar to FIGS. 9 and 10, FIG. 12 shows a diagram of a top-perspective view and FIG. 13 shows a diagram of a side-profile view of the mobile hologram apparatus 116. As shown in FIGS. 11 to 13, the mobile hologram apparatus 116, in the uncompressed state, has a pyramid shape with a flat top (i.e., a frustum).

It should be appreciated, that in some embodiments, the mobile hologram apparatus 116 may be constructed or formed into the solid structure shown in FIGS. 11 to 13. However, in these embodiments, the mobile hologram apparatus 116 may not be collapsible or capable of being actuated into the compressed state. In these embodiments, the mobile hologram apparatus 116 may used at promotional events and provided to consumers rather than being used in direct mail pieces.

Mobile Hologram Embodiment

Figure 14:
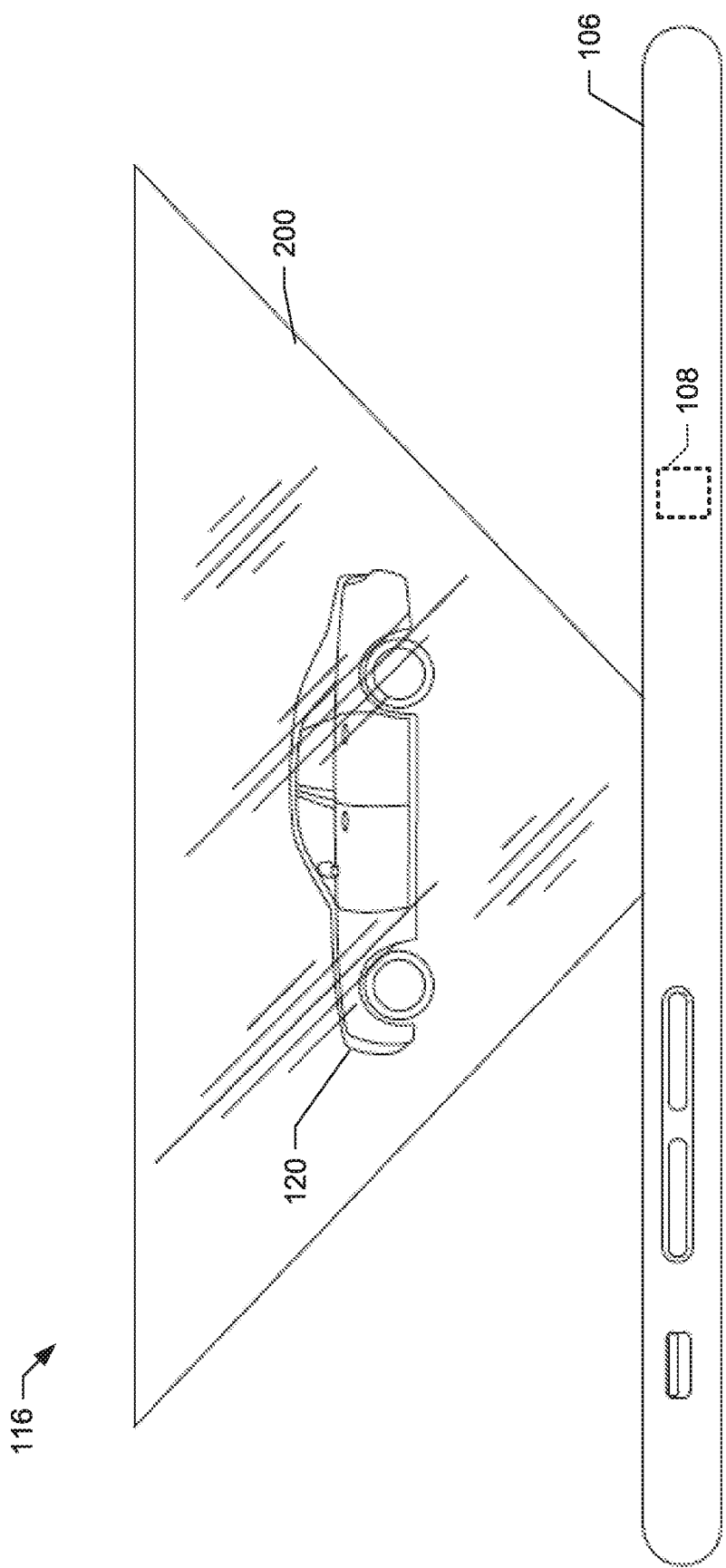
FIGS. 14 and 15 show diagrams of the example mobile hologram apparatus of FIG. 1 in an uncompressed state placed atop a consumer device displaying a holographic image, according to example embodiments of the present disclosure.
Figure 15:
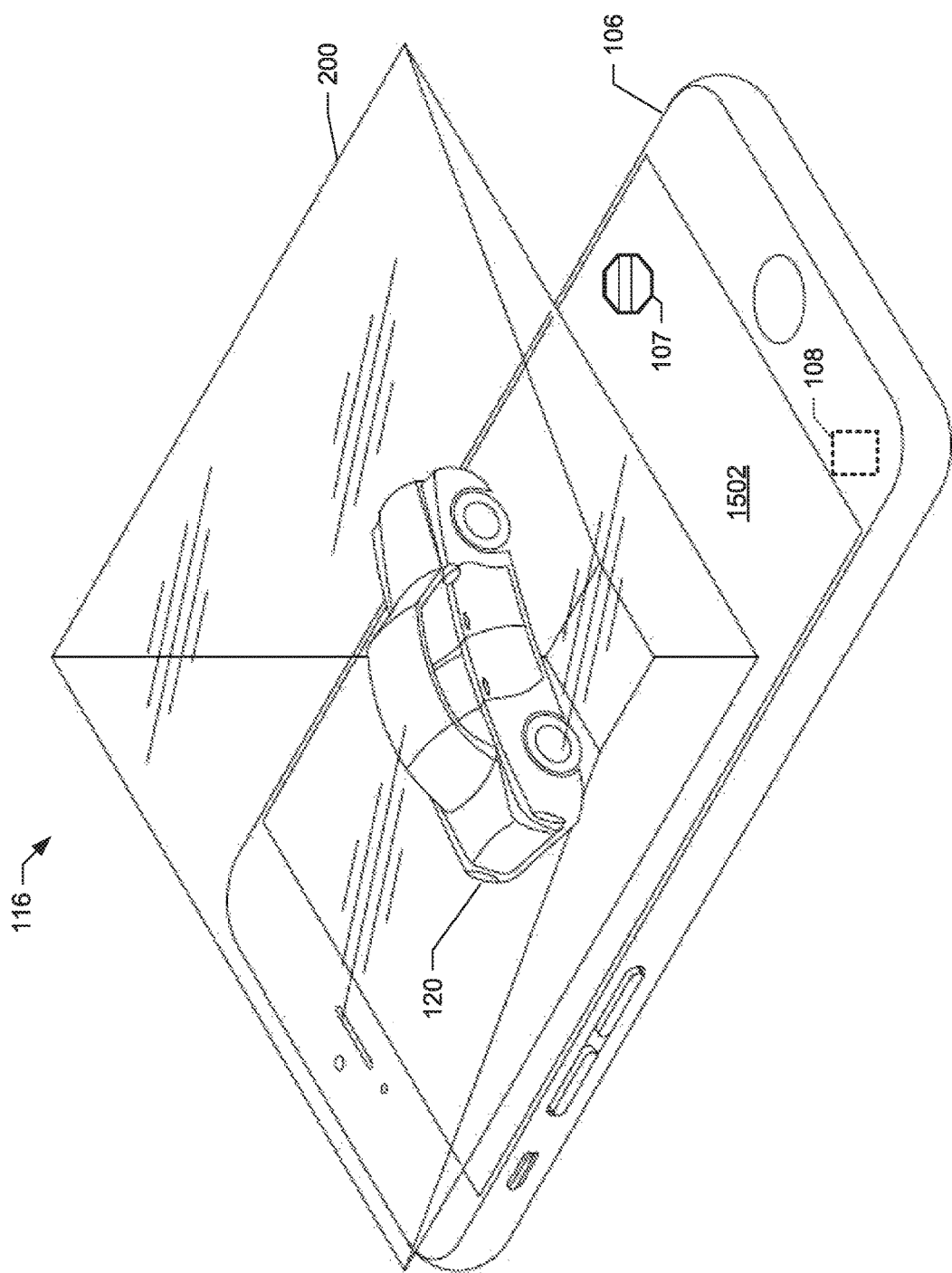

FIGS. 14 and 15 show diagrams of the example mobile hologram apparatus 116 of FIG. 1 in an uncompressed state placed atop a consumer device 106, according to example embodiments of the present disclosure. In these illustrated examples, the consumer device 106 has received content 108 from a content server 102 and/or content 108 included within an identifier 122. The content 108 corresponds to an image of a vehicle, shown in the figures as holographic image 120. It should be appreciated that the vehicle shown in FIGS. 14 and 15 is one example of a holographic image. In other embodiments, the holographic image may include any two-dimensional or three-dimensional image including for example, a logo or an animated character such as Princess Leia.

As discussed above in connection with FIG. 1, after the example mobile hologram apparatus 116 self-actuates into the uncompressed state, a consumer places the example mobile hologram apparatus 116 on a display screen 1502 of the consumer device 106. In some instances, the content 108 may specify guidelines or other markers for positioning the example mobile hologram apparatus 116. Further, the top section 202 may include an adhesive to maintain a holding force between the example mobile hologram apparatus 116 and the display screen. Without the adhesive, the mobile hologram apparatus 116 may inadvertently slide over the display screen as a result of user-movement, a tilt angle of the consumer device 106, and/or wind.

A media player or application 107 on the consumer derive 106 is configured to render the content 108 into one or more images for display on the display screen 1502. Four two-dimensional images of the holographic image are displayed by the consumer device 106. The four images are configured to be aligned with the four side sections 204 of the mobile hologram apparatus 116. The four two-dimensional images may be identical or may vary to sophisticate the appearance of the holographic image 120. Light waves or beams produced by displaying the images propagate into the mobile hologram apparatus 116 and reflect off the side sections 204 and/or the base section 206. Intersections or interference of the reflected light produces a three-dimensional pattern, which is shown as the holographic image 120.

In the examples of FIGS. 14 and 15, the holographic image 120 is shown as rotating. The appearance of rotation may be caused by the media player or application 107 playing a sequence of images of a rotating vehicle. Alternatively, the media player or application 107 may play a video (essentially a sequence of images), that shows the vehicle rotating. In some embodiments, the appearance of rotation may be caused by a consumer touching or gesturing near, for example, the side sections 204 of the mobile hologram apparatus 116. In other embodiments, the application 107 or more generally, the display screen 1502 may display control features that enable a consumer to manipulate the holographic image 120, including, for example, rotate, zoom, pan, enlarge, fast forward, rewind, next image, next video, etc.

Alternative Mobile Hologram Sheets

The mobile hologram sheet 200 of FIG. 2 provides one example for creating the example mobile hologram apparatus 116. However, other designs may be used and the features and benefits of the example mobile hologram apparatus 116 disclosed herein are not limited to any particular design. For example, FIGS. 16 to 18 show diagrams of alternative sheets 1600 and 1800 that may be used to create mobile hologram apparatuses, according to example embodiments of the present disclosure.

Figure 16:
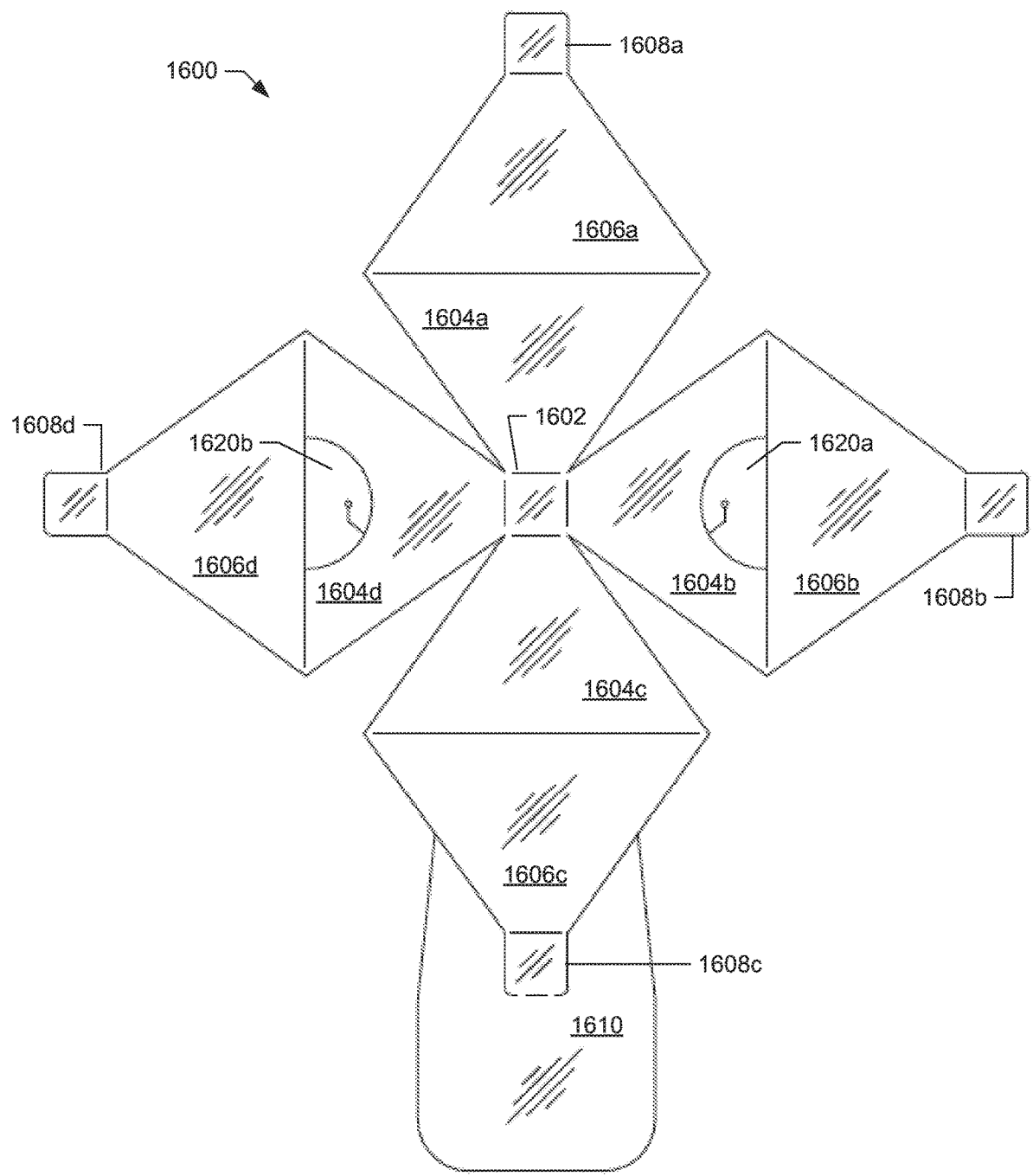
FIGS. 16 to 18 show diagrams of alternative sheets that may be used to create mobile hologram apparatuses, according to example embodiments of the present disclosure.

Specifically, FIG. 16 shows a diagram of a sheet 1600 that is foldable into an octahedron with flat top and bottom (e.g., a dual-frustum). Similar to the sheet 200 of FIG. 2, the sheet 1600 includes a top section 1602 and side sections 1604. However, instead of base arms 208, the sheet 1600 includes lower side sections 1606 and a lower section 1608. Further, the sheet 1600 includes a stand section 1610. Unlike the example shown in FIG. 2, the top section 1602 is not placed on the consumer device 106. Instead, lower sections 1608 and stand 1610 are placed on the display screen of the consumer device 106.

Figure 17:
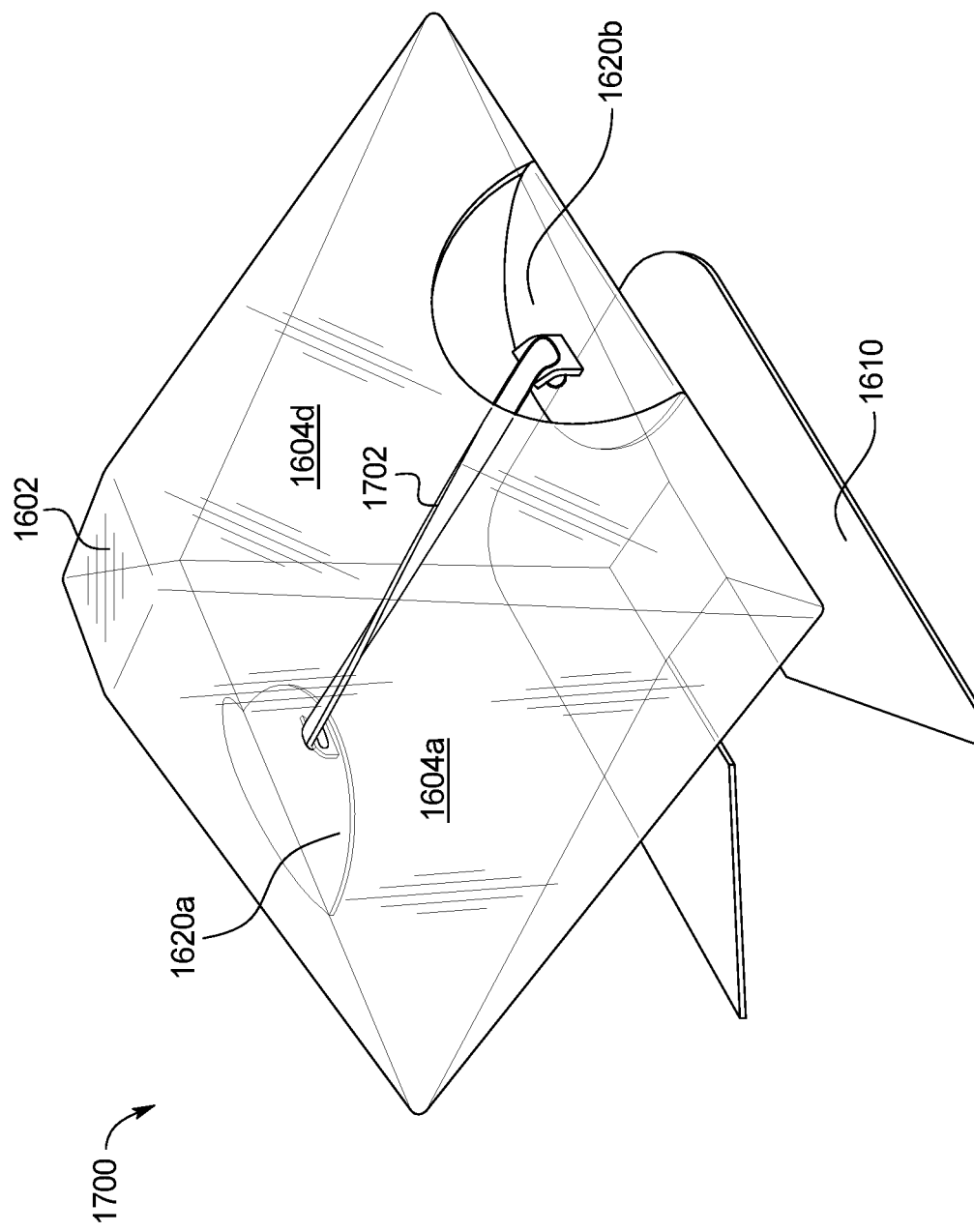
Figure 18:
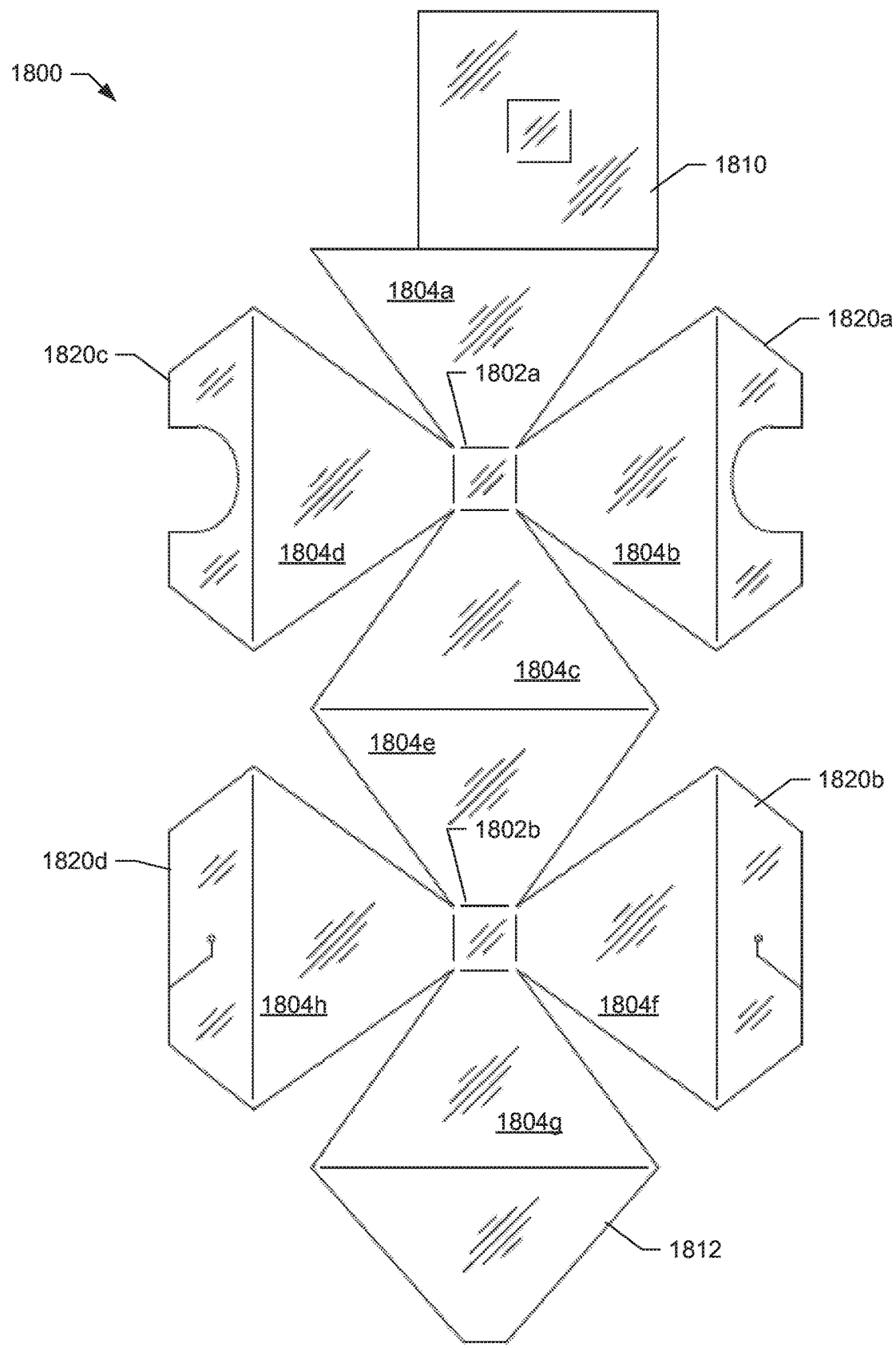

FIG. 17 shows a diagram of the sheet 1600 folded or assembled into an uncompressed structure to form a mobile hologram apparatus 1700. As shown in FIG. 17, the lower side sections 1606 in conjunction with the lower section 1608 form a second pyramid structure. Depending on the angle of light beams from the consumer device 106, the illustrated mobile hologram apparatus 1700 may display a holographic image within the side sections 1604 and/or within the lower side sections 1606. Alternatively, a holographic image may be displayed within a middle of the mobile hologram apparatus 1700.

As illustrated in FIG. 17, the lower sections 1608 are joined together at the stand section 1610. The connection of the lower sections 1608 within the stand 1610 holds the sheet 1600 together in a compressed and uncompressed state. The example stand section 1610 is configured to provide support for the mobile hologram apparatus 1700 when placed on the consumer device 106. The stand section 1610 may also be used to align the mobile hologram apparatus 1700 with the image displayed on the consumer device 106.

Another difference between sheets 200 and 1600 is the placement location of the elastic band. Instead of placing the elastic band around a perimeter of the base section 206, in the embodiment of FIGS. 16 and 17, an elastic band 1702 is configured to run through a center of the mobile hologram apparatus 1700. For instance, side sections 1604*b* and 1604*d* include tabs 1620*a* and 1620*d* that are configured to fold inward. The tabs 1620 include through holes configured to accept ends of the elastic band 1702, as illustrated in FIG. 17. The elastic band 1702 is configured to pull the opposite sides of the mobile hologram apparatus 1700 toward each other, which causes the mobile hologram apparatus 1700 to actuate from a compressed state to an uncompressed state.

FIG. 18 shows a diagram of another sheet 1800 that may be used to create a mobile hologram apparatus. In this example, the sheet 1800 comprises a dual set of top sections 1802 and side sections 1804, which are used to form an octahedron with flat top and bottom (e.g., a dual-frustum), similar to FIG. 16. In addition, the sheet 1800 includes a stand section 1810. A base section 1812 is also included, which is connected to the stand section 1810 to secure the mobile hologram apparatus in a compressed or uncompressed state.

Further, the sheet 1800 includes tab sections 1820 that are used to secure an elastic band. For instance, the tab sections 1820*a* and 1820*b* are jointed together when the mobile hologram apparatus is assembled. Tab sections 1820*c* and 1820*d* are also joined together. An elastic band is connected to the through holes of tab sections 1820*b* and 1820*d*. Similar to the mobile hologram apparatus 1700 of FIG. 17, the elastic band is configured to pass through the middle of the mobile hologram apparatus created from the sheet 1800 of FIG. 18. The compression of the side sections 1804*b*, 1804*d*, 1804*f*, and 1804*h* causes the mobile hologram apparatus to actuate from a compressed to an uncompressed state.

Alternative Deployment Embodiment

As discussed above in conjunction with FIGS. 1 to 18, the mobile hologram apparatus includes an elastic band or tension mechanism to cause automatic self-assembly or self-actuation from a compressed state to uncompressed state. However, in some embodiments, the mobile hologram apparatus may be configured to be opened to an uncompressed state by a consumer. In these embodiments, the elastic band is omitted and replaced with sections, tabs, or panels that enable the mobile hologram apparatus to be secured in the uncompressed state. For example, the mobile hologram apparatus may include one or more tabs or panels that are moved after the mobile hologram apparatus is opened into the uncompressed state. The movement of the tabs or panels may lock or restrict the mobile hologram apparatus from falling back into the compressed state. The movement of the tabs or panels may be caused by the consumer or may be configured to move automatically after the mobile hologram apparatus is opened to the compressed state. For example, a tab may lock base arms 208 of FIG. 2 in place. The tabs and/or panels may be released by the consumer to enable the mobile hologram apparatus to be placed back into the compressed state.

Flowcharts of the Example Processes

Figure 19:
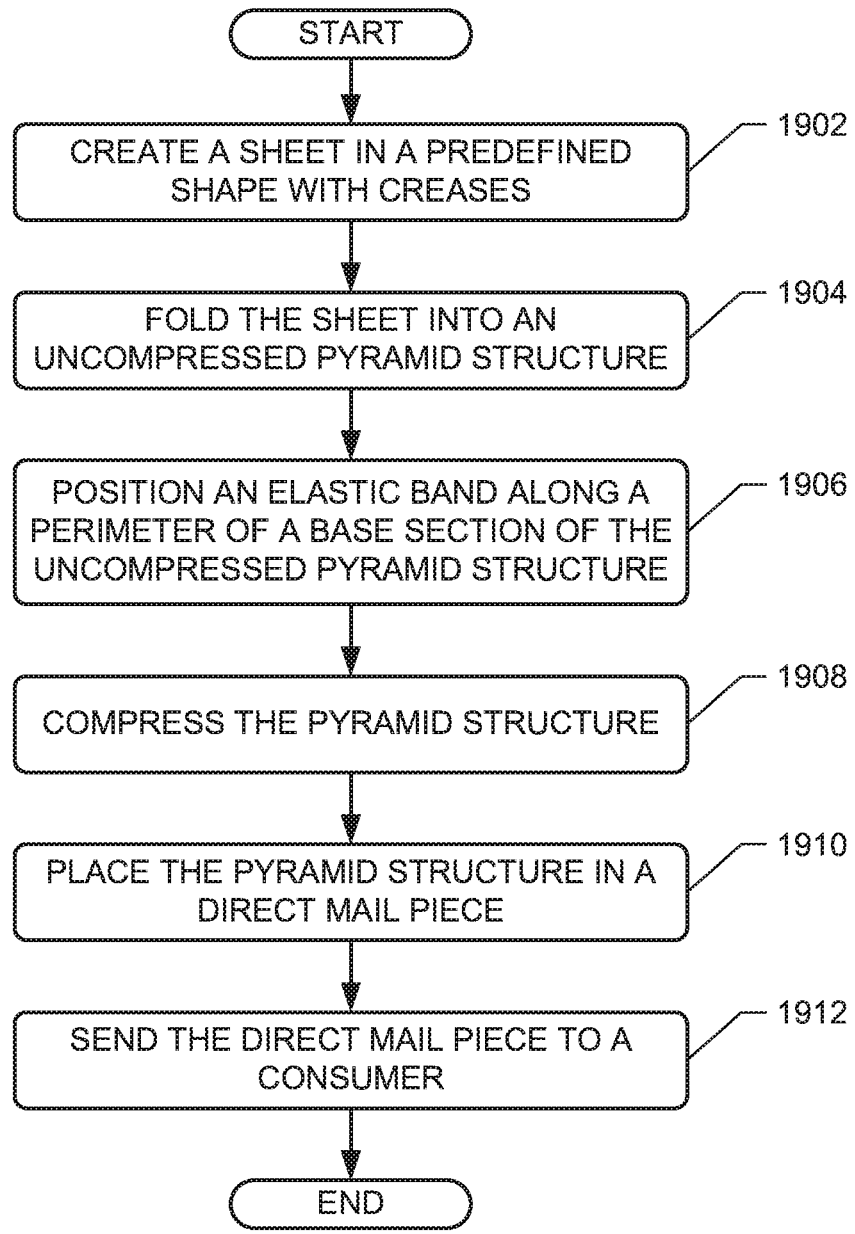
FIG. 19 illustrates a flow diagram showing an example procedure to create the mobile hologram apparatus of FIGS. 1 to 15, according to an example embodiment of the present disclosure.

FIG. 19 illustrates a flow diagram showing an example procedure 1900 to create the mobile hologram apparatus 116 of FIGS. 1 to 15, according to an example embodiment of the present disclosure. Although the procedure 1900 is described with reference to the flow diagram illustrated in FIG. 19, it should be appreciated that many other methods of performing the steps associated with the procedure 1900 may be used. For example, the order of many of the blocks may be changed, certain blocks may be combined with other blocks, and many of the blocks described are optional. Further, the actions described in procedure 1900 may be performed among multiple devices including, for example a plastic sheet forming machine, a plastic sheet folding machine, and a plastic sheet packaging machine.

The procedure 1900 begins when the example sheet 200 of FIG. 2 is created, fabricated, or molded (block 1902). In some examples, the sheet 200 may be formed into the predefined shape shown in FIG. 2. Further the sheet 200 may be formed with the creases 214. In other examples, the sheet 200 may be cut from a rectangular plastic sheet using a stencil or programmed routine. After the sheet 200 is cut, the creases may be added. In some instances, the sheet 200 may be formed from more than one layer. In these instances, the layers are connected together. In some instances, opaque layers are added to base arms or other sections. At this point, the sheet may be printed or otherwise coated with ink, film, or other materials to incorporate marketing or promotional information or improve light reflectivity. In addition, an identifier 122 may also be printed or otherwise connected to the mobile hologram apparatus 116.

After the sheet 200 is formed, the sheet 200 is folded or assembled into an uncompressed pyramid structure to create the mobile hologram apparatus 116 (block 1904). An elastic band is then placed along a perimeter of a base of the mobile hologram apparatus 116 (block 1906). The mobile hologram apparatus 116 is then placed into the compressed state and placed inside or within a direct mail piece (blocks 1908 and 1910). The mobile hologram apparatus 116 is next mailed within the direct mail piece to a consumer (block 1912). The example procedure 1900 then ends with respect to manufacture of the particular mobile hologram apparatus 116.

In some embodiments, the mobile hologram apparatus 116 may be sent to another party that is responsible for creating direct mail pieces. In these examples, the mobile hologram apparatus 116 is shipped, after being manufactured into the assembled, compressed state. The party responsible for assembling or creating the direct mail pieces may then incorporate the mobile hologram apparatus 116 with the direct mail piece.

Figure 20:
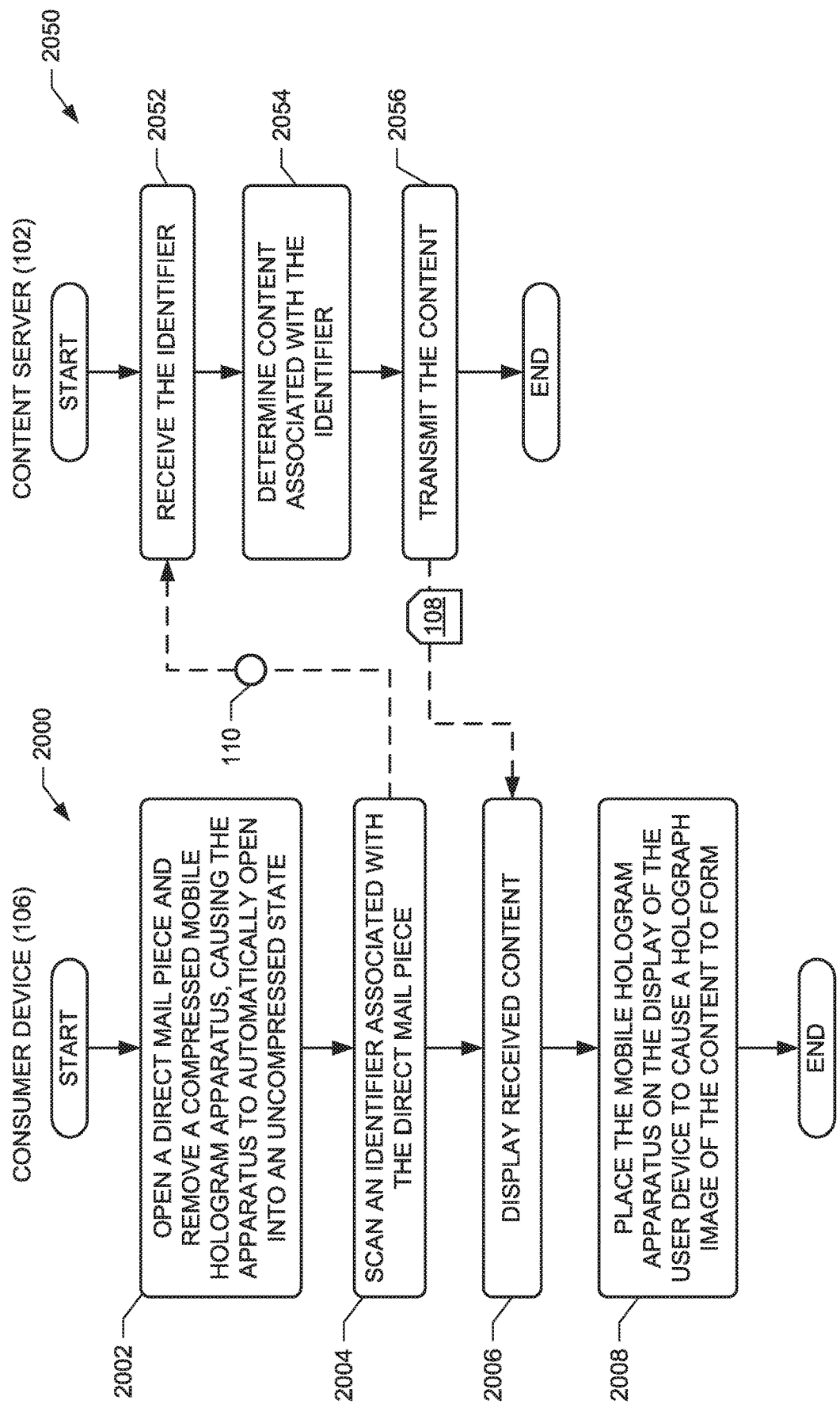
FIG. 20 illustrates a flow diagram showing example procedures to display content using the mobile hologram apparatus of FIGS. 1 to 15, according to example embodiments of the present disclosure.

FIG. 20 illustrates a flow diagram showing example procedures 2000 and 2050 to display content using the mobile hologram apparatus 116 of FIGS. 1 to 15, according to example embodiments of the present disclosure. Although the procedures 2000 and 2050 are described with reference to the flow diagram illustrated in FIG. 20, it should be appreciated that many other methods of performing the steps associated with the procedures 2000 and 2050 may be used. For example, the order of many of the blocks may be changed, certain blocks may be combined with other blocks, and many of the blocks described are optional. Further, the actions described in the procedures 2000 and 2050 may be performed among multiple devices including, for example a third-party system 112.

The procedure 2000 of FIG. 20 begins when a consumer receives a direct mail piece and removes the mobile hologram apparatus 116. When removed, the mobile hologram apparatus 116 is in a compressed state. However, after being removed by the consumer, the mobile hologram apparatus 116 self-actuates and automatically opens from the compressed state to the uncompressed state (block 2002). The consumer then uses the consumer device 106 to scan an identifier 122 on the mobile hologram apparatus 116 and/or the direct mail piece (block 2004). Scanning the identifier 122 enables the consumer device 106 to determine an address or location of a content server 102 that is storing related content. The consumer device transmits a request message 110 to the identified content server 102 that includes an identifier, code, or address of content related to the identifier 122. In instances where the content is included within the identifier, a request message is not transmitted.

After transmitting the message 110, the example consumer device 106 receives one or more messages from the content server 102 that include the content 108. The consumer device 106 uses a media player or application 107 to display the received content 108 (block 2006). A consumer then places the mobile hologram apparatus 116 on top of a display screen of the consumer device 106, which causes a holographic image 120 to form within the mobile hologram apparatus 116 (block 2008). After the holographic image 120 is displayed, the example procedure ends 2000. However, in some embodiments, the consumer device 106 and/or application 107 may monitor and record the consumer's interaction with the mobile hologram apparatus 116 and any subsequent product/service engagement or purchase.

In some examples, the consumer device 106 may delay playing the content 108 until the mobile hologram apparatus 116 is placed on top of the display screen. For instance, the consumer device 106 may use capacitive sensing within the display screen or proximity sensing using a camera to determine when the mobile hologram apparatus 116 is in place. Alternatively, the consumer device 106 may display a play button that is pressed by the consumer after the mobile hologram apparatus 116 is placed on the display screen of the consumer device.

In further examples, the consumer device 106 may include instructions or routines that determine a position of the mobile hologram apparatus 116 with respect to the screen using for example, capacitive sensing or analysis of images recorded by a camera. The consumer device 106 may then display instructions for positioning the mobile hologram apparatus 116 within guidelines. Alternatively, the mobile hologram apparatus 116 may cause the content 108 to be displayed at the location of the mobile hologram apparatus 116. In these alternative instances, the consumer device 106 and/or the application 107 may track any movement of the mobile hologram apparatus 116 along the display screen and adjust where the image is displayed on the screen so that the image is continuously displayed within the mobile hologram apparatus 116.

The procedure 2050 of FIG. 20 begins when the content server 102 receives a message 110 from the consumer device that identifies content (block 2052). The message 110 includes an identifier of the content or a code related to the content. The content server 102 accesses a memory or database to determine a location of the related content 108 (block 2054). The content server 102 then transmits one or more messages (or file(s)) that include a copy of the requested content 108 to the consumer device 106 (block 2056). In some instances, the content 108 may also include instructions for rendering or changing the display of the content based on conditions or input from a consumer. The example procedure 2050 then ends.

CONCLUSION

It will be appreciated that all of the disclosed methods and procedures described herein can be implemented using one or more computer programs or components. These components may be provided as a series of computer instructions on any computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A mobile hologram sheet apparatus comprising:
   a square-shaped top section located within a middle of the mobile hologram sheet apparatus;
   four trapezoidal-shaped side sections each having a bottom edge and a top edge, the bottom edge being longer than the top edge, each of the side sections connected at the respective top edge to the top section at separate sides of the top section;
   four base arms each respectively connected to the bottom edge of one of the side sections at junctions such that a base arm is connected to each side section at a respective junction, each base arm having an L-shape such that a bottom of the L-shape is connected to the bottom edge of the corresponding side section; and
   a first four preformed creases located at respective junctions between each of the top edges of the four side sections and the top section,
   wherein each junction between each of the side sections and the respective base arms includes a second preformed crease and at least one recess section that provides a gap between a portion of the side section and the respective base arm, and
   wherein a diameter of the top section is less than a length of each of the bottom edges of the side sections.

2. The mobile hologram sheet apparatus of claim 1, wherein the sheet apparatus includes at least one of a plastic, a biological polymer, glass, a carbon-based compound, crystal, and combinations thereof.

3. The mobile hologram sheet apparatus of claim 1, wherein the sheet apparatus, when unfolded has a length between 10 centimeters ("cm") and 75 cm across opposing base arms, and a width between 10 cm and 75 cm across opposing base arms.

4. The mobile hologram sheet apparatus of claim 1, wherein a material forming the sheet apparatus has a thickness between 0.1 millimeters ("mm") and 4 mm.

5. The mobile hologram sheet apparatus of claim 1, wherein the material forming the sheet apparatus is transparent.

6. The mobile hologram sheet apparatus of claim 1, wherein an exterior of the top section includes a transparent adhesive.

7. The mobile hologram sheet apparatus of claim 1, wherein each of the base arms includes:
   a first side edge configured to contact one of the second preformed creases at a junction of one of the adjacent side sections and base arms; and
   a second side edge opposite the first side edge having a curved shape that enables the base arms to interconnect together when folded.

8. The mobile hologram sheet apparatus of claim 1, wherein each junction between each of the side sections and the respective base arms includes two recess sections that are on opposite sides of the respective second preformed crease.

9. The mobile hologram sheet apparatus of claim 1, wherein the at least one recess section is dimensioned to enable an elastic band to pass through and contact the respective second preformed crease.

10. The mobile hologram sheet apparatus of claim 1, wherein the base arms include at least one of an opaque paint, an opaque film, an opaque sticker, an opaque print, or an opaque dye, and
wherein the top section and the side sections are transparent.

11. The mobile hologram sheet apparatus of claim 1, wherein an exterior of the base arms is opaque and an interior of the base arms is reflective.

12. A mobile hologram sheet apparatus comprising:
a square-shaped top section located within a middle of the mobile hologram sheet apparatus;
four trapezoidal-shaped side sections each having a bottom edge and a top edge, the bottom edge being longer than the top edge, each of the side sections connected at the respective top edge to the top section at separate sides of the top section; and
four base arms each respectively connected to the bottom edge of one of the side sections at junctions such that a base arm is connected to each side section at a respective junction
wherein a diameter of the top section is less than a length of each of the bottom edges of the side sections, and
wherein each junction between each of the side sections and the respective base arms includes a preformed crease and at least one recess section that provides a gap between a portion of the side section and the respective base arm.

13. The mobile hologram sheet apparatus of claim 12, wherein the at least one recess section is dimensioned to enable an elastic band to pass through and contact the respective preformed crease.

14. The mobile hologram sheet apparatus of claim 12, wherein the sheet apparatus includes at least one of a plastic, a biological polymer, glass, a carbon-based compound, crystal, and combinations thereof.

15. The mobile hologram sheet apparatus of claim 12, wherein the sheet apparatus, when unfolded has a length between 10 centimeters ("cm") and 75 cm across opposing base arms, and a width between 10 cm and 75 cm across opposing base arms, and
wherein a material forming the sheet apparatus has a thickness between 0.1 millimeters ("mm") and 4 mm.

16. The mobile hologram sheet apparatus of claim 12, wherein the base arms include at least one of an opaque paint, an opaque film, an opaque sticker, an opaque print, or an opaque dye, and
wherein the top section and the side sections are transparent.

17. The mobile hologram sheet apparatus of claim 12, wherein an exterior of the base arms is opaque and an interior of the base arms is reflective.

18. The mobile hologram sheet apparatus of claim 12, further comprising:
second preformed creases located at respective junctions between each of the top edges of the four side sections and the top section.

19. The mobile hologram sheet apparatus of claim 18, wherein each of the base arms includes:
a first side edge configured to contact one of the preformed creases at the respective junction of one of the adjacent side sections and base arms; and
a second side edge opposite the first side edge having a curved shape that enables the base arms to interconnect together when folded.

20. The mobile hologram sheet apparatus of claim 18, wherein each junction between each of the side sections and the respective base arms includes two recess sections that are on opposite sides of the respective preformed crease.

* * * * *